(12) United States Patent
Isono et al.

(10) Patent No.: US 8,806,893 B2
(45) Date of Patent: Aug. 19, 2014

(54) MANUFACTURING METHOD OF A GLASS BLANK FOR MAGNETIC DISK AND MANUFACTURING METHOD OF A GLASS SUBSTRATE FOR MAGNETIC DISK

(75) Inventors: Hideki Isono, Kofu (JP); Akira Murakami, Akiruno (JP); Shinji Eda, Nirasaki (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/397,180

(22) Filed: Feb. 15, 2012

(65) Prior Publication Data

US 2013/0042649 A1  Feb. 21, 2013

Related U.S. Application Data

(60) Provisional application No. 61/444,405, filed on Feb. 18, 2011.

(51) Int. Cl.
| | |
|---|---|
| *C03B 11/08* | (2006.01) |
| *C03B 7/094* | (2006.01) |
| *C03B 7/14* | (2006.01) |
| *C03B 40/04* | (2006.01) |
| *G11B 5/84* | (2006.01) |
| *C03C 19/00* | (2006.01) |
| *C03B 7/10* | (2006.01) |
| *C03B 7/16* | (2006.01) |
| *C03C 21/00* | (2006.01) |

(52) U.S. Cl.
CPC . *C03B 7/10* (2013.01); *C03B 40/04* (2013.01); *G11B 5/8404* (2013.01); *C03C 19/00* (2013.01); *C03B 7/16* (2013.01); *C03C 21/001* (2013.01); *C03B 11/088* (2013.01); *C03B 7/14* (2013.01); *C03B 2215/70* (2013.01)

USPC ............................................................ 65/66

(58) Field of Classification Search
CPC .......... C03B 7/094; C03B 7/14; C03B 11/08; C03B 11/088; C03B 35/00; C03B 35/005; C03B 7/10; C03B 7/16; C03B 40/04; C03B 2215/70
USPC ........................................ 65/66; 264/1.1, 2.7
See application file for complete search history.

(56) References Cited

U.S. PATENT DOCUMENTS

| | | | | |
|---|---|---|---|---|
| 3,155,481 A | * | 11/1964 | Boyce | 65/104 |
| 3,271,126 A | * | 9/1966 | Jenkins | 65/160 |
| 4,199,337 A | * | 4/1980 | Asam | 65/428 |
| 4,961,773 A | * | 10/1990 | Takahara et al. | 65/174 |
| 5,394,910 A | * | 3/1995 | Sweetland | 141/98 |

(Continued)

FOREIGN PATENT DOCUMENTS

JP 3709033 B 8/2005

*Primary Examiner* — Matthew Daniels
*Assistant Examiner* — Cynthia Szewczyk
(74) *Attorney, Agent, or Firm* — Global IP Counselors, LLP

(57) ABSTRACT

A manufacturing method of a glass blank for magnetic disk including a pair of principal surfaces, the method including: dropping process for dropping a lump of molten glass; pressing process for forming a sheet glass material by sandwiching simultaneously the lump from both sides of the dropping path of the lump with surfaces of the pair of dies facing together, and performing press forming to the lump; and temperature adjusting process for adjusting temperature of the lump before the pressing process such that viscosity variation of the lump is reduced with respect to positions over the entirety of the lump in the pressing process.

21 Claims, 13 Drawing Sheets

(56) References Cited

U.S. PATENT DOCUMENTS

| | | | |
|---|---|---|---|
| 5,762,673 A * | 6/1998 | Hirota et al. | 65/25.1 |
| 6,442,975 B1 * | 9/2002 | Murakami et al. | 65/61 |
| 6,484,539 B1 * | 11/2002 | Nordine et al. | 65/385 |
| 2002/0121110 A1 * | 9/2002 | Saito et al. | 65/30.14 |
| 2003/0134734 A1 * | 7/2003 | Nishimoto et al. | 501/69 |
| 2004/0237592 A1 * | 12/2004 | Iguchi et al. | 65/127 |
| 2005/0204777 A1 * | 9/2005 | Mori et al. | 65/112 |
| 2008/0110207 A1 * | 5/2008 | Fukuda et al. | 65/66 |

* cited by examiner

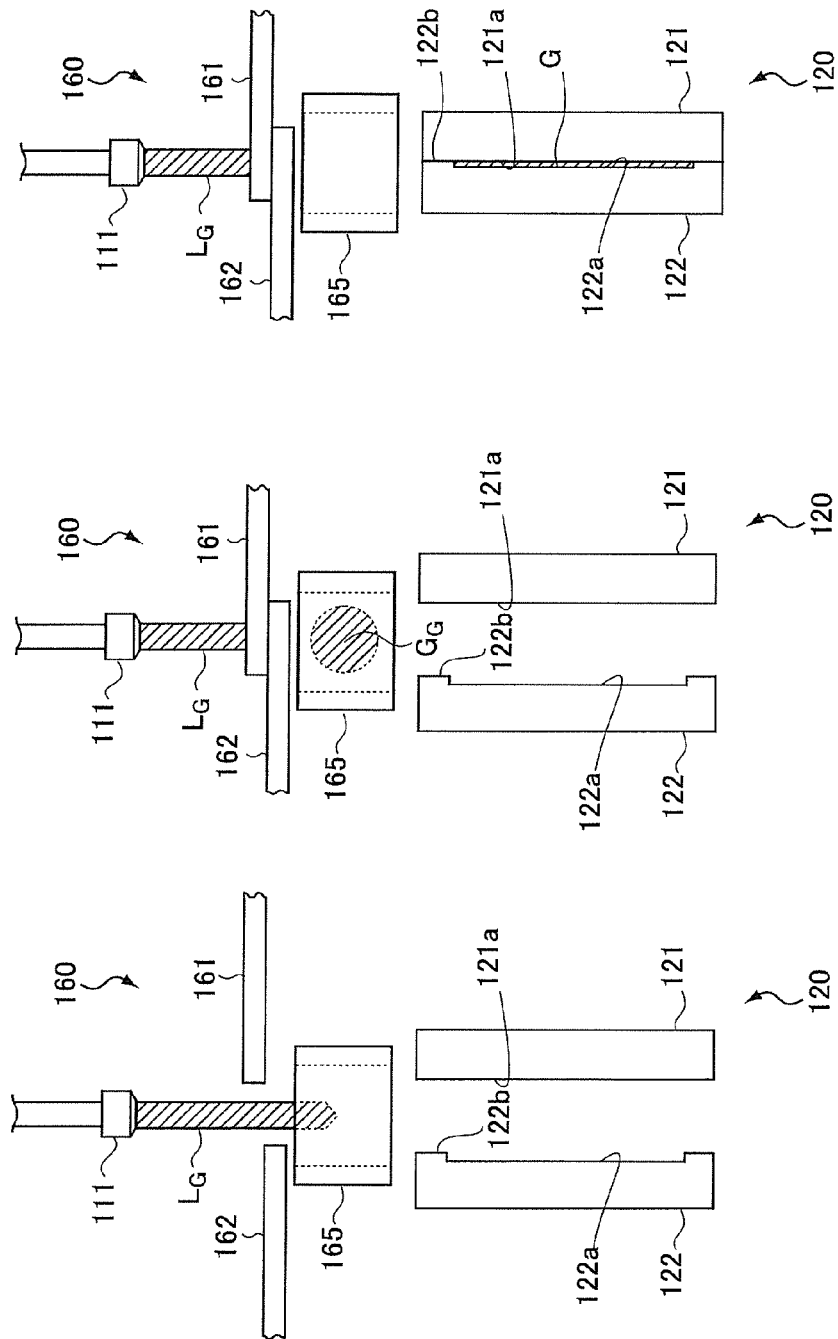

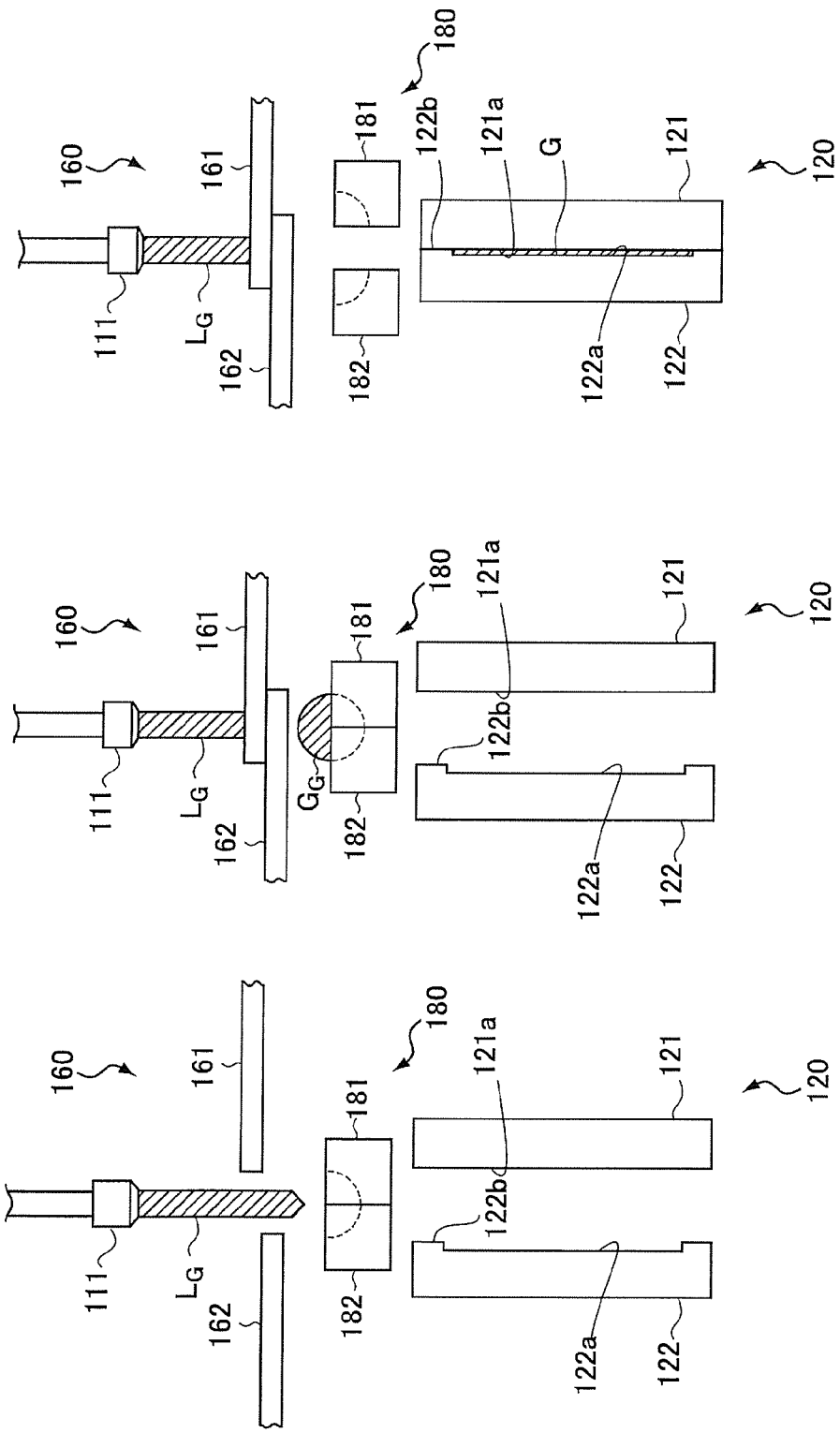

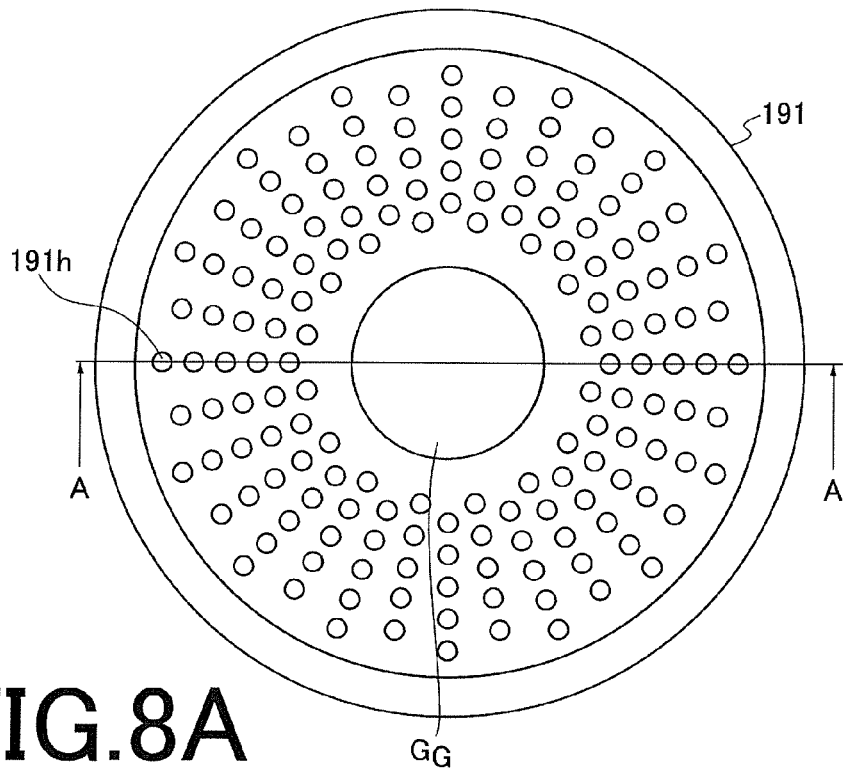
FIG.8A
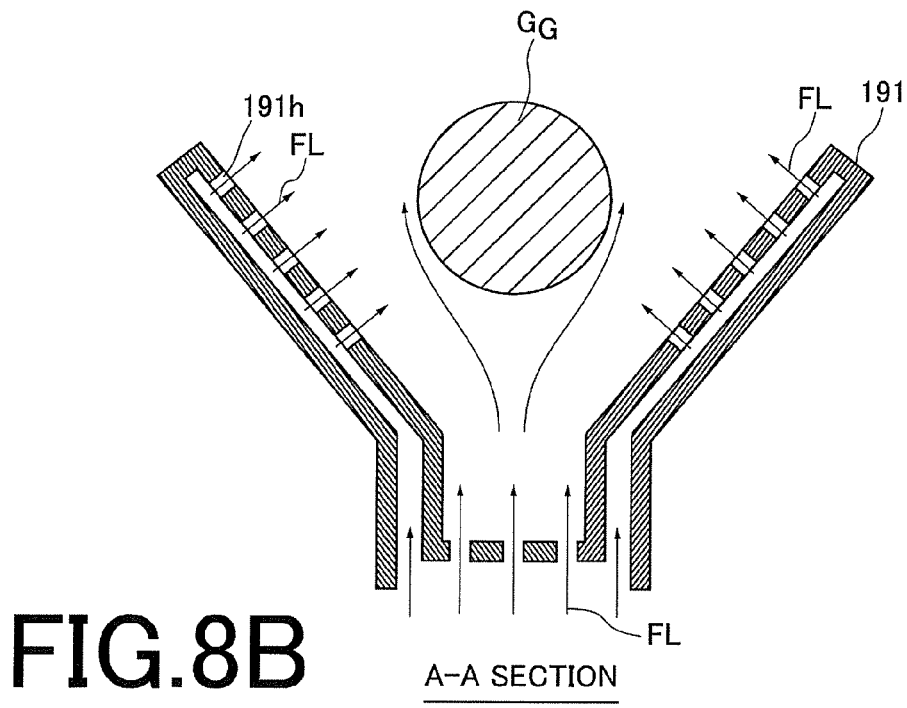
FIG.8B  A-A SECTION

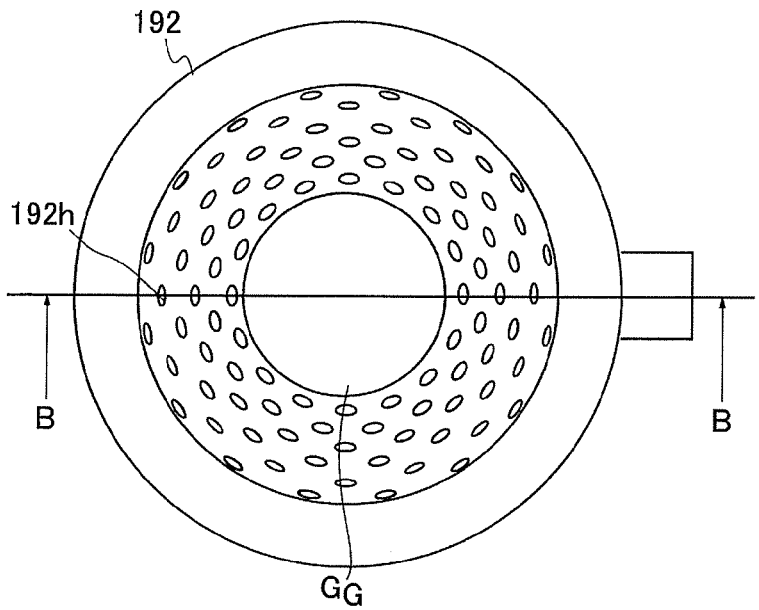
FIG.10A
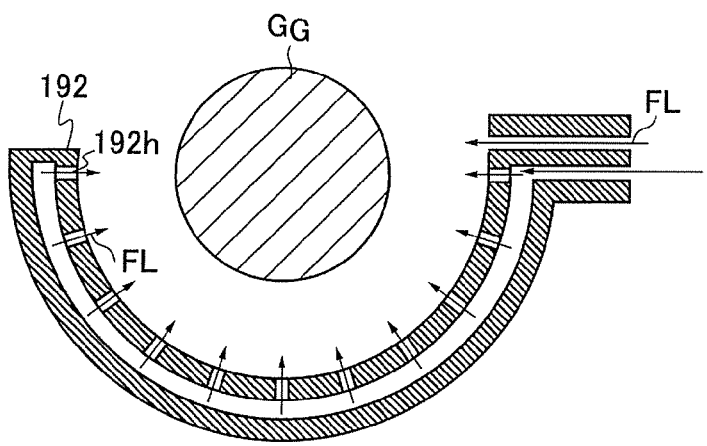
FIG.10B  B-B SECTION

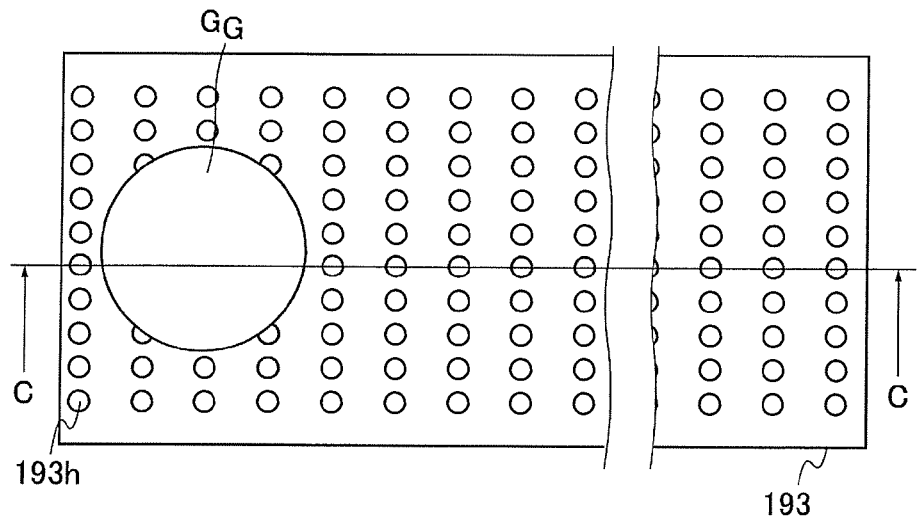
FIG.12A
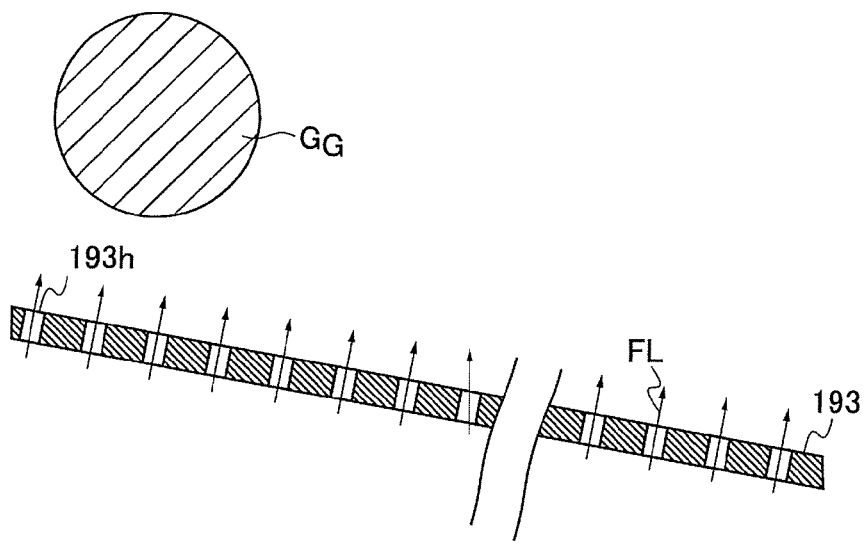
FIG.12B  C-C SECTION

MANUFACTURING METHOD OF A GLASS BLANK FOR MAGNETIC DISK AND MANUFACTURING METHOD OF A GLASS SUBSTRATE FOR MAGNETIC DISK

CROSS-REFERENCE TO RELATED APPLICATION

This application is based upon and claims the benefit of priority of U.S. Provisional Application No. 61/444,405 filed in the US Patent and Trademark Office on Feb. 18, 2011, the entire contents of which are incorporated herein by reference.

FIELD

The present invention relates to a manufacturing method of a glass substrate for magnetic disk and a glass blank for magnetic disk having a pair of principal surfaces.

BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because a glass substrate is hardly plastically deformed compared with a metallic substrate.

The magnetic recording density is being increased in order to respond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in a single disk substrate. In order to respond to the further increase of the storage capacity, a floating distance of the magnetic head from the magnetic recording surface is extremely shortened to form the fine magnetic recording information area. With such substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head may easily cause a head crush trouble or a thermal asperity trouble. Because these troubles are caused by the micro irregularity or a particle on the magnetic disk surface, the glass substrate is formed such that the surface irregularity of an end face is also decreased as much as possible in addition to that of the principal surface.

For example, the glass substrate used in the magnetic disk is manufactured by the following method: specifically, a glass gob made of molten glass (a lump of the glass material) is supplied onto a lower die that is a backing gob forming die; press forming is performed to the glass gob to prepare a sheet glass material using the lower die and an upper die that is a counter gob forming die; and the sheet glass material is formed into a glass substrate for information recording medium (for example, see Japanese Patent No. 3709033).

With the method disclosed in the Japanese Patent No. 3709033, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, the sheet glass material that becomes a base of the glass substrate for magnetic disk is formed. Then, the glass substrate for magnetic disk is obtained after a grinding process and a polishing process.

In the grinding process, for example, grinding is performed using alumina loose abrasive grains. In the grinding process, a first grinding process and a second grinding process are performed using the loose abrasive grains having different particle sizes. A particle size of the loose abrasive grain used in the second grinding process is set smaller than that of the loose abrasive grain used in the first grinding process. Therefore, the coarse grinding and the fine grinding are performed in this order.

The polishing process includes a first polishing process in which the loose abrasive grain such as cerium oxide and a hard resin material polisher are used and a second polishing process in which colloidal silica and a soft resin material polisher are used. The particle size of the abrasive grain used in the first polishing process is smaller than that of the abrasive grain used in the second grinding process of the grinding process. The particle size of the abrasive grain used in the second polishing process is smaller than that of the abrasive grain used in the first polishing process.

Thus, in the surface processing of the glass substrate, the first grinding process, the second grinding process, the first polishing process, and the second polishing process are performed in this order, and the glass substrate is formed such that accuracy of surface quality such as surface roughness of the glass substrate is gradually enhanced.

Here, in forming the sheet glass material, a mold release agent is applied to the die surface in order to prevent the glass material from fusing to the die surfaces of the upper die and lower die. The surface roughness of the principal surface of the sheet glass material is increased because of the mold release agent. There is a large surface temperature difference between the upper die and the lower die, and the lower die to which the glass gob (a lump of the glass material) is supplied becomes high temperature. Because the surface temperature difference causes a temperature distribution in a thickness direction of the formed sheet glass material and in a plane of the plate, a shrinkage quantity of the sheet glass material that is taken out from the die and cooled also has a distribution in the thickness direction of the formed sheet glass material and in the plane of the plate. The sheet glass material is easy to warp, and therefore good flatness of the formed sheet glass material is not achieved.

The flatness of the sheet glass material can be improved by the grinding (first grinding process). For example, in the grinding process, a removal stock (ground quantity) is increased in order to improve the flatness. However, when the removal stock is increased in the grinding process, a deep crack may be generated in the surface of the sheet glass material. Therefore, in the polishing process that is a post-process, the removal stock (polishing quantity) is also inevitably increased in an attempt to eliminate the deep crack.

However, when the removal stock is increased in the polishing process in which the loose abrasive grains and the resin polisher are used, the neighborhood in the outer circumferential edge portion is rounded in the principal surface of the sheet glass material to cause a "roll-off problem" of the edge portion. That is, because the neighborhood in the outer circumferential edge portion is rounded in the sheet glass material, a distance between the magnetic layer and the magnetic head in the neighborhood of the outer circumferential edge portion becomes larger than the floating distance of the magnetic head in another portion of the glass substrate when the magnetic disk is prepared using the sheet glass material as the glass substrate. The surface irregularity is generated because the neighborhood of the outer circumferential edge portion has the rounded shape. As a result, the recording and reading operations of the magnetic head are not precisely performed in the magnetic layer in the neighborhood of the outer circumferential edge portion. This is the "roll-off problem".

When the removal stock is increased in the polishing process, a time necessary for the polishing process is unfavorably lengthened.

In view of the above, in order to improve flatness of disk-shaped glass material after press formed, the inventor has studied a method including "dropping process for dropping a lump of molten glass; pressing process for forming a sheet glass material by sandwiching simultaneously the lump from both sides of the dropping path of the lump with surfaces of the pair of dies facing together, and performing press forming to the lump". With the method, use of a mold release agent is not required, and flatness may be improved because temperature difference is not likely to occur between the pair of dies.

However, as the inventor has studied, it has become clear that, when manufacturing with the above method, thickness varies with respect to positions on the principal surface (thickness variation).

Even if grinding, for example, is performed to such glass material, removal stock becomes uneven on the machined surface, and degree of parallelization cannot be therefore improved. Further, there is a problem that defect which originates from the glass material remains, or that flatness of the glass material becomes even worse.

When cutting molten glass with a cutting blade, a cut mark may remain in the sheet glass material. Then, there is also a problem that the cut mark still remains as a defect in the machined glass substrate for magnetic disk.

In view of the above, an object of the present invention is to provide a method for manufacturing a sheet glass material (glass blank) of which thickness variation is small with respect to positions on the principal surface such that a glass substrate for magnetic disk excellent in flatness is efficiently manufactured without a defect.

SUMMARY OF THE INVENTION

First aspect of the present invention is a manufacturing method of a glass blank for magnetic disk including a pair of principal surfaces. The method may include: dropping process for dropping a lump of molten glass; pressing process for forming a sheet glass material by sandwiching simultaneously the lump from both sides of the dropping path of the lump with surfaces of the pair of dies facing together, and performing press forming to the lump; and temperature adjusting process for adjusting temperature of the lump before the pressing process such that viscosity variation of the lump is reduced with respect to positions over the entirety of the lump in the pressing process.

Second aspect of the present invention is a manufacturing method of a glass blank for magnetic disk including a pair of principal surfaces. The method may include: dropping process for dropping a lump of molten glass; temperature adjusting process for heating the lump with temperature higher than the transition temperature of the glass; and pressing process for forming a sheet glass material by sandwiching simultaneously the lump from both sides of the dropping path of the lump with surfaces of the pair of dies facing together, and performing press forming to the lump.

Preferably, the temperature adjusting process may heat the lump by use of a heating section, the heating section positioned around dropping path of the lump.

Preferably, the temperature adjusting process may heat the lump by use of a holding section. The holding section may hold at least a vertically lower portion of the dropped lump.

Preferably, the manufacturing method of a glass blank for magnetic disk may further includes cutting process for cutting molten glass with cutting blades. The temperature adjusting process may heat a cut mark that is formed with the cutting blades in the cutting process.

Preferably, difference of the viscosity of the two cut marks formed on the lump may be five million poise or less.

Preferably, temperatures of the pair of dies may be lower than a strain point of the glass.

Preferably, the glass may contain, as converted based on the oxide, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$.

Third aspect of the present invention is a manufacturing method of a glass blank for magnetic disk. The method may include: cutting process for cutting molten glass to obtain a lump of molten glass; heating process for heating a cut portion of the lump of molten glass; and forming process for preparing a glass blank for magnetic disk of sheet glass material by press forming the lump of molten glass with a pair of dies after the heating process.

Preferably, temperature of the molten glass may be 1,000 degree Celsius or higher.

Preferably, the heating process may heat the lump with temperature higher than transition temperature of the glass.

Preferably, temperatures of the pair of dies at timing when the press forming begins may be lower than a strain point of the glass.

Preferably, the glass may contain, as converted based on the oxide, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$.

Preferably, the heating process may heat the lump of molten glass while the lump cut in the cutting process drops, and wherein the pair of dies is located on the both sides of the dropping path.

Preferably, the heating process may blow out heated gas for at least a cut portion of the lump of molten glass cut in the cutting process.

Fourth aspect of the present invention is a manufacturing method of a glass substrate for magnetic disk by use of a glass blank for magnetic disk manufactured by a method of a glass blank for magnetic disk. The method of a glass blank for magnetic disk may include: cutting process for cutting molten glass to obtain a lump of molten glass; heating process for heating a cut portion of the lump of molten glass; and forming process for preparing a glass blank for magnetic disk of sheet glass material by press forming the lump of molten glass with a pair of dies after the heating process.

Preferably, the manufacturing method of a glass substrate for magnetic disk may include a machining process for machining a principal surface of the glass blank for magnetic disk with removal stock of 50 μm or less.

BRIEF DESCRIPTION OF THE DRAWINGS

Referring now to the attached drawings which form a part of this original disclosure:

FIG. 4A is a side view illustrating an arrangement before the molten glass and a cutting unit contact;

FIG. 4B is a side view illustrating an arrangement after the cutting unit cut the molten glass;

FIG. 4C is a side view illustrating an arrangement when a pressing unit performs press forming for a lump of the molten glass;

FIG. 7A is a side view illustrating modification 1 before the molten glass and a cutting unit contact;

FIG. 7B is a side view illustrating an arrangement after the cutting unit cut the molten glass;

FIG. 7C is a side view illustrating an arrangement when the pressing unit performs press forming for a lump of the molten glass;

FIG. 8A is a plan view illustrating a condition in which the gob is temperature-equalized using a funnel-shaped temperature-equalization section;

FIG. 8B is an A-A sectional of FIG. 8A illustrating a condition in which the gob is temperature-equalized using the funnel-shaped temperature-equalization section;

FIG. 10A is a plan view illustrating a condition in which the gob is temperature-equalized using a spoon-shaped temperature-equalization section;

FIG. 10B is a B-B sectional of FIG. 10A illustrating a condition in which the gob is temperature-equalized using the spoon-shaped temperature-equalization section;

FIG. 12A is a plan view illustrating a condition in which the gob is temperature-equalized using a sheet-shaped temperature-equalization section;

FIG. 12B is a C-C sectional of FIG. 12A illustrating a condition in which the gob is temperature-equalized using the sheet-shaped temperature-equalization section;

DESCRIPTION OF THE PREFERRED EMBODIMENTS

First Embodiment

A manufacturing method of a glass substrate for magnetic disk according to the present invention will be described in detail below.

(Magnetic Disk and Glass Substrate for Magnetic Disk)

Figure 1A:
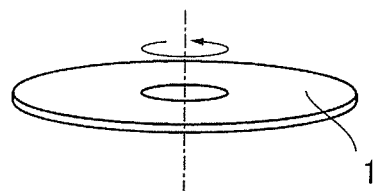
FIG. 1A is a view illustrating a magnetic disk prepared using a glass substrate for magnetic disk according to an embodiment of the invention.
Figure 1B:
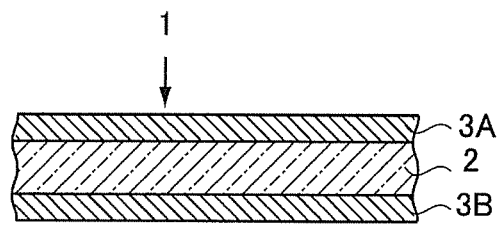
FIG. 1B is a view illustrating a section of the magnetic disk.
Figure 1C:
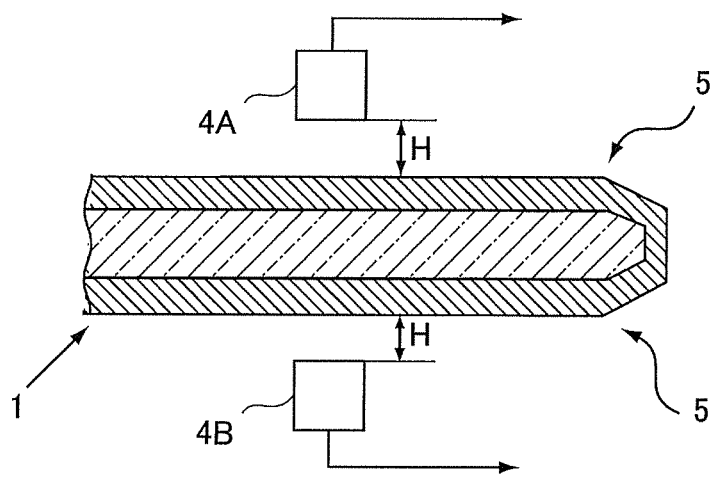
FIG. 1C is a view illustrating an arrangement in which a magnetic head is floated above the surface of the magnetic disk.

Referring now to FIGS. 1A to FIG. 1C, a magnetic disk manufactured using a glass substrate for magnetic disk will be explained. FIG. 1A is a view illustrating a magnetic disk prepared using a glass substrate for magnetic disk according to an embodiment of the invention. FIG. 1B is a view illustrating a section of the magnetic disk. FIG. 1C is a view illustrating an arrangement in which a magnetic head is floated above the surface of the magnetic disk.

As illustrated in FIG. 1A, a magnetic disk 1 is a ring-shaped, and is driven around its axis of rotation. As illustrated in FIG. 1B, the magnetic disk 1 has a glass substrate 2 and at least magnetic layers 3A, 3B.

Note that, except the magnetic layers 3A, 3B, although not illustrated, an adhesive layer, a soft magnetic layer, a non-magnetic underlying layer, the perpendicular magnetic recording layer, a protective layer, and a lubricant layer are deposited. For example, Cr alloy is applied for the adhesive layer, and the adhesive layer acts as a bonding layer to the glass substrate 2. For example, CoTaZr alloy is applied for the soft magnetic layer. For example, Ru alloy is applied for the non-magnetic underlying layer. A granular magnetic layer is applied for the perpendicular magnetic recording layer. For example, material containing carbon hydride is applied for the protective layer. Fluorine resin is applied for the lubricant layer, for example.

The magnetic disk 1 will be described with a more specific example. A CrTi adhesive layer, a CoTaZr/Ru/CoTaZr soft magnetic layer, a Ru underlying layer, a CoCrPt—$SiO_2$.$TiO_2$ granular magnetic layer, and a carbon hydride protective layer are sequentially deposited in both the principal surfaces of the glass substrate 2 with a sputtering apparatus. A perfluoropolyether lubricant layer is then deposited on the uppermost layer by a dipping method.

When used in a hard disk device, the magnetic disk 1 rotates around the axis of rotation with rotation speed of 7,200 rpm for example. As illustrated in FIG. 1C, magnetic heads 4A and 4B of a hard disk device float from surfaces of the magnetic disk 1 by a distance H because of the high speed rotation of the magnetic disk 1. The distance H is 5 nm for example. At this point, the magnetic heads 4A and 4B record and read pieces of information in and from the magnetic layers. With the floating of the magnetic heads 4A and 4B, they record and read the information in and from the magnetic layer of the magnetic disk 1 at a short distance without sliding the magnetic heads 4A and 4B onto the magnetic layer, thereby realizing a fine magnetic recording information area and high density of the magnetic recording.

A central portion of the glass substrate 2 of the magnetic disk 1 to an outer circumferential edge portion 5 are precisely processed with target surface accuracy, and the magnetic heads 4A and 4B can be therefore precisely operated while the distance H of 5 nm is maintained.

Regarding surface irregularity of the principal surface of the glass substrate 2 used in the magnetic disk 1, flatness is 4 µm or less, and surface roughness is 0.2 nm or less. The flatness of 4 µm or less for example is target flatness required for the glass substrate for magnetic disk as a final product.

The flatness can be measured with a flatness tester FT-900 manufactured by NIDEK CO., LTD. for example.

The roughness of the principal surface Ra may be arithmetic average roughness Ra obtained with a scanning probe microscope (atomic force microscope) manufactured by SII Nano Technology Inc by measuring an area of 1 µm×1 µm with resolution of 512×256 pixels.

Aluminosilicate glass, soda-lime glass, and borosilicate glass can be used as a material for the glass substrate 2. Particularly, the aluminosilicate glass can be suitably used in that chemically strengthening can be performed and in that the glass substrate for magnetic disk excellent for the flatness of the principal surface and the strength of the substrate can be prepared.

Aluminosilicate glass is preferably used containing, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$. A glass material containing, denoted as molar percentages: 57 to 74% $SiO_2$, 0 to 2.8% $ZnO_2$, 3 to 15% $Al_2O_3$, 7 to 16% $Li_2O$, 4 to 14% $Na_2O$ as the aluminosilicate glass may be also suitably used to perform chemically strengthening.

(Manufacturing Method of a Glass Substrate for Magnetic Disk)

Figure 2:
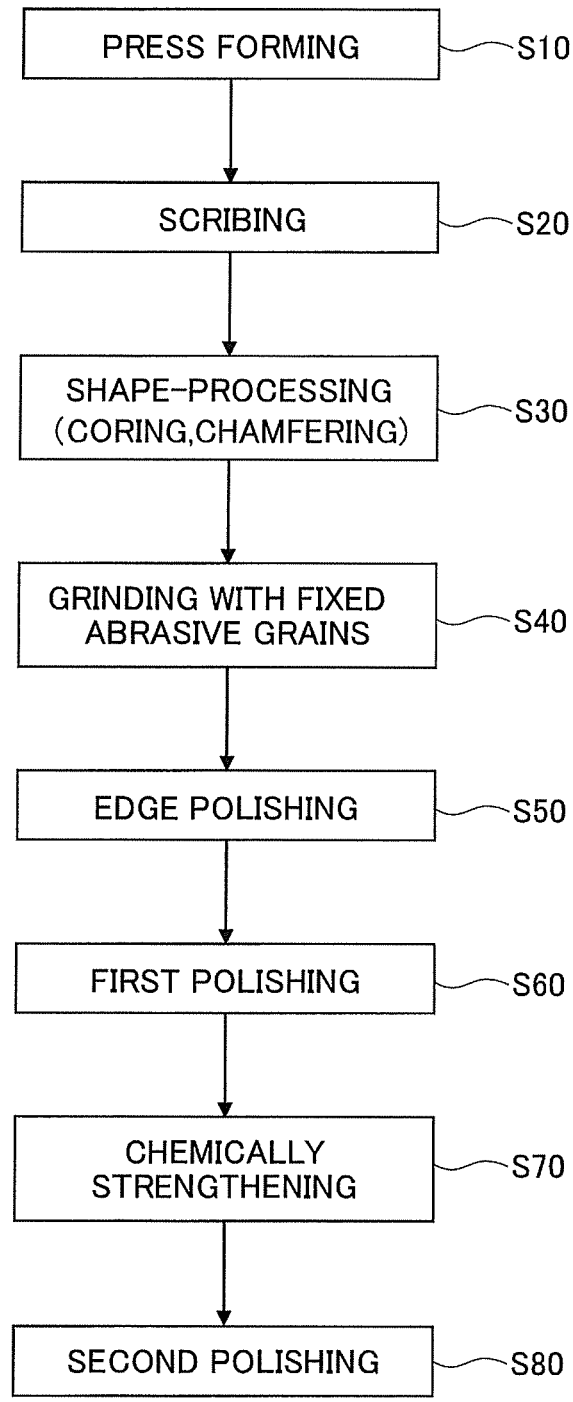
FIG. 2 is a view illustrating a flow of a manufacturing method of a glass substrate for magnetic disk according to an embodiment of the invention.

Next, with reference to FIG. 2, a flow of a manufacturing method of a glass substrate for magnetic disk will be explained. FIG. 2 is a view illustrating a flow of an embodiment of a manufacturing method of a glass substrate for magnetic disk.

As illustrated in FIG. 2, a sheet glass material is manufactured by the press forming (Step S10). Next, the formed sheet glass material is scribed (Step S20). Next, the scribed sheet glass material is shape-processed (Step S30). Next, grinding is performed to the sheet glass material using fixed abrasive grains (Step S40). Then, edge polishing is performed to the sheet glass material (Step S50). First polishing is performed to the principal surface of the sheet glass material (Step S60). Next, after the first polishing, the sheet glass material is chemically strengthened (Step S70). Then, the second polishing is performed to the chemically strengthened sheet glass material (Step S80).

The detail of each process will be explained below.

(a) Press Forming Process

Figure 3:
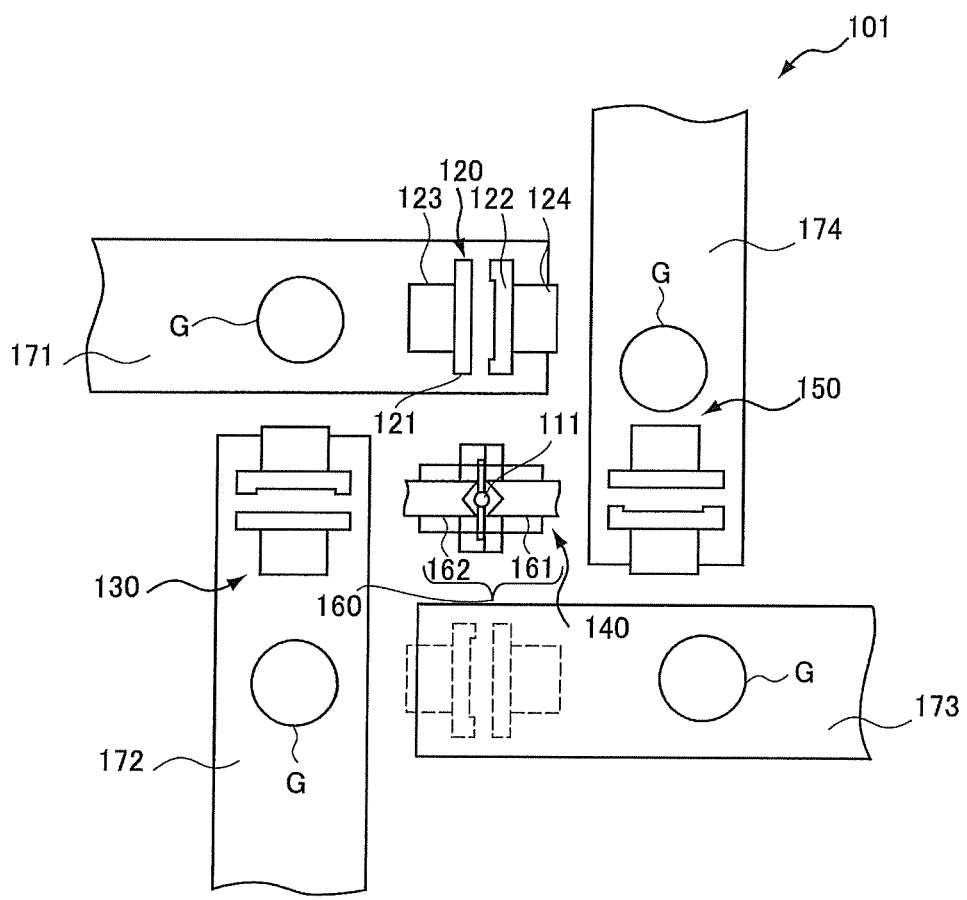
FIG. 3 is a plan view of an apparatus used in press forming.

Referring now to FIG. 3, the press forming process (Step S10) will be explained. FIG. 3 is a plan view of an apparatus used in press forming. As illustrated in FIG. 3, an apparatus 101 includes four sets of pressing units 120, 130, 140, 150, and a cutting unit 160.

The cutting unit 160 is provided on a path of the molten glass that flows out from a molten glass outflow port 111. A lump of the molten glass is cut by the cutting unit 160 to drop down in vertically downward direction. Each of the pressing units 120, 130, 140, and 150 sandwiches the lump of the molten glass from both sides of the dropping path of the lump with facing surfaces of a pair of dies at the same timing, thereby forming a sheet glass material. Temperature of the molten glass that flows out from the molten glass outflow port 111 may be higher than 1,000 degree Celsius for example.

In the example illustrated in FIG. 3, the four sets of pressing units 120, 130, 140, and 150 are provided at intervals of 90 degrees around the molten glass outflow port 111.

Each of the pressing units 120, 130, 140, and 150 is driven by a moving mechanism (not illustrated) so as to be able to proceed and retreat with respect to the molten glass outflow port 111. That is, each of the pressing units 120, 130, 140, and 150 can be moved between a catch position and a retreat position. The catch position (position where the pressing unit 140 is drawn by a solid line in FIG. 3) is located immediately below the molten glass outflow port 111. The retreat position (positions where the pressing units 120, 130, and 150 are drawn by solid lines in FIG. 3 and a position where the pressing units 140 is drawn with a broken line in FIG. 3) is located away from the molten glass outflow port 111.

The cutting unit 160 is provided on a path of the molten glass between the catch position and the molten glass outflow port 111. The cutting unit 160 cuts the molten glass flowing out from the molten glass outflow port 111 to obtain a proper quantity of the lump of the molten glass (hereinafter also referred to as "gob"). The cutting unit 160 includes a first cutting blade 161 and a second cutting blade 162.

A heating section 165 (not illustrated in FIG. 3) is provided around the cutting unit 160. An arrangement of the heating section 165 will be described later.

The first cutting blade 161 and the second cutting blade 162 are driven so as to intersect each other on the path of the molten glass at constant timing. When the first cutting blade 161 and the second cutting blade 162 intersect each other, the molten glass is cut to obtain the gob. The obtained gob drops for the catch position in the vertically downward direction.

Here, the pressing unit 120 will be explained in detail. The pressing unit 120 includes a first die 121, a second die 122, a first driving unit 123, and a second driving unit 124.

Each of the first die 121 and the second die 122 is a plate-shaped member including a surface used to perform the press forming to the gob. The first die 121 and the second die 122 are disposed such that normal directions of the surfaces are substantially horizontal, and such that the surfaces are parallel to each other.

The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other. Each of the first driving unit 123 and the second driving unit 124 is, for example, a mechanism in which an air cylinder, a solenoid and a coil spring are combined.

Because each structure of the pressing units 130, 140, and 150 is similar to that of the pressing unit 120, the descriptions of the pressing units 130, 140, and 150 are omitted.

After each pressing unit moves to the catch position, the dropping gob is sandwiched between the first die and the second die by driving the first driving unit and the second driving unit, and the gob is formed into a predetermined thickness while rapidly cooled, thereby preparing the disk-shaped sheet glass material G. After the pressing unit moves to the retreat position, the first die and the second die are separated to cause the formed sheet glass material G to drop down.

A first conveyer 171, a second conveyer 172, a third conveyer 173, and a fourth conveyer 174 are provided below the retreat positions of the pressing units 120, 130, 140, and 150, respectively. Each of the first to fourth conveyers 171 to 174 receives the sheet glass material G that drops down from the corresponding pressing unit, and the conveyer conveys the sheet glass material G to an apparatus (not illustrated) of the next process.

In the present embodiment, the apparatus 101 is configured such that the pressing units 120, 130, 140, and 150 sequentially move to the catch position and move to the retreat position while the gob is sandwiched. Thus, the sheet glass material G can continuously be formed without waiting for the cooling of the sheet glass material G in each pressing unit.

Note that the sheet glass material G may be continuously be formed by sandwiching the gob by use of a single pressing unit 120. In this case, the first die 121 and the second die 122 are opened immediately after the press forming of the gob $G_G$, and press forms the subsequently dropping lump of the molten glass.

Here, referring to the side views illustrated in FIGS. 4A to 4C, the press forming process according to the present embodiment will be explained. FIG. 4A is a side view illustrating an arrangement before a molten glass material $L_G$ and a cutting unit 160 contact. FIG. 4B is a side view illustrating an arrangement after the cutting unit 160 cut the molten glass material $L_G$. FIG. 4C is a side view illustrating an arrangement when a pressing unit 120 performs press forming for a lump $G_G$ of the molten glass.

As illustrated in FIGS. 4A to 4C, the heating section 165 is provided between the pressing unit 120 that has moved to the catch position and the molten glass outflow port 111. The heating section 165 is a heater for example. In an example illustrated in FIGS. 4A to 4C, the heating section 165 is provided between the pressing unit 120 and the cutting unit 160, and may be further provided between the cutting unit 160 and the molten glass outflow port 111. Preferably, the heating section 165 may be positioned at a position evenly apart from the dropping path of the gob $G_G$. The heating section 165 exemplified in FIGS. 4A to 4C, has a rectangular shape in horizontal surface.

Temperature of the heating section 165 may be higher than room temperature, and may preferably be close to temperature of the molten glass $L_G$. In the present embodiment, the temperature of the heating section 165 is higher than transition temperature $T_G$ of the molten glass $L_G$. Note that, although not illustrated in FIGS. 4A to 4C, a power supply device is connected to the heating section 165 to heat the heating section 165.

As illustrated in FIG. 4A, a molten glass material $L_G$ continuously flows out from the molten glass outflow port 111. The temperature of the molten glass $L_G$ is about 1,200 degree Celsius for example. In an example illustrated in FIG. 4A, the molten glass material $L_G$ flowing out from the molten glass outflow port 111 is heated from its top successively.

As illustrated in FIG. 4B, the cutting unit 160 is driven at predetermined timing to cut the molten glass material $L_G$ using the cutting blades 161 and 162. Then, the cut molten glass becomes a substantially spherical gob $G_G$ due to a surface tension thereof. In the example illustrated in FIG. 4B, an outflow quantity per time of the molten glass material $L_G$ and a driving interval of the cutting unit 160 are adjusted such that a gob $G_G$ having a diameter of about 15 mm is formed every time the cutting unit 160 is driven.

The formed gob $G_G$ drops in the vertically downward direction. The first driving unit 123 and the second driving unit 124 are driven such that the first die 121 and the second die 122 come close each other. As illustrated in FIG. 4C, this allows the gob $G_G$ to be captured (caught) between the first die 121 and the second die 122. Further, the inner circumferential surface 121a of the first die 121 and the inner circumferential surface 122a of the second die 122 come close with a minute gap, and then the gob $G_G$, which is sandwiched between the inner circumferential surface 121a of the first die 121 and the inner circumferential surface 122a of the second die 122, is formed into a thin sheet.

Note that a projected spacer 122b is provided at the inner circumferential surface 122a of the second die 122 in order to keep the gap constant between the inner circumferential surface 121a of the first die 121 and the inner circumferential surface 122a of the second die 122. The spacer 122b of the second die abuts on the inner circumferential surface 121a of the first die 121 so that the gap is kept constant between the inner circumferential surface 121a of the first die 121 and the inner circumferential surface 122a of the second die 122 to obtain a sheet-like space.

A temperature control mechanism (not illustrated) may be preferably provided in each of the first die 121 and second die 122. With the temperature control mechanism, temperatures at the first die 121 and second die 122 may be maintained lower than a strain point of the molten glass material $L_G$.

A time until the portion of the gob $G_G$ excluding the cutting mark T is completely confined between the first die 121 and the second die 122 after the gob $G_G$ comes into contact with the inner circumferential surface 121a of the first die 121 or the inner circumferential surface 122a of the second die 122, is as extremely short as about 0.06 second. Therefore, the portion of the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped sheet glass material G.

Note that, in the present embodiment, for example, the formed sheet glass material G is a disk-shaped plate having a diameter of 75 to 80 mm and a thickness of about 1 mm.

After the first die 121 and the second die 122 are closed, the pressing unit 120 quickly moves to the retreat position. Then, the other pressing unit 130 moves to the catch position, and performs the pressing to the gob $G_G$.

After the pressing unit 120 moves to the retreat position, the first die 121 and the second die 122 are kept closed until the sheet glass material G is sufficiently cooled (for example, until temperature of the sheet glass material G becomes below a yield point). Then, the first driving unit 123 and the second driving unit 124 are driven to separate the first die 121 and the second die 122, the sheet glass material G drops down from the pressing unit 120, and is received by the conveyer 171 located below the pressing unit 120 (see FIG. 3).

Here, when the heating section 165 is not provided, the molten glass material $L_G$ is continuously supplied from the molten glass outflow port 111, and is gradually cooled with surrounding air. The longer time has passed since the lower portion of the molten glass material $L_G$ was supplied from the molten glass outflow port 111. Therefore, as a whole except the cut mark, the temperature of the molten glass material $L_G$ immediately after being cut by the cutting unit 160 becomes lower to the lower end. It should be noted that temperatures of the two cut marks, which contact the cutting unit 160 and are formed, are lower than that of central portion of the gob $G_G$. Further, the temperature of the cut mark which earlier contacts the cutting unit 160 to be formed is lower that that of the cut mark which later contacts the cutting unit 160 to be formed.

As the temperature of the molten glass is higher, the viscosity of the molten glass is smaller. Therefore, as temperature variation is larger with respect to positions over the entirety of the gob $G_G$, viscosity variation of the gob $G_G$ is larger with respect to positions over the entirety of the gob $G_G$. Then, the gob $G_G$ is hard to be press formed evenly, and thickness variation is likely to be large accordingly.

By contrast, in the present embodiment, the heating section 165, which is provided between the pressing unit 120 that has moved to the catch position and the molten glass outflow port 111, heats the molten glass $L_G$ and the gob $G_G$, thereby controlling the temperature of the gob $G_G$. This enables reduction in temperature variation with respect to positions over the entirety of the gob $G_G$. Temperature variation with respect to positions over the entirety of the gob $G_G$ is 50 degree Celsius or less for example. Therefore, it is possible to reduce viscosity variation with respect to positions over the entirety of the gob $G_G$, and to press form the same more evenly. More specifically, difference of the viscosity of the two cut marks formed on the gob $G_G$ may be preferably five million poise or less. Note that the viscosity of the cut mark formed on the gob $G_G$ is obtained from a temperature of a surface portion of the gob $G_G$ where each cut mark is formed.

In the present invention, by performing press forming with the method described above, thickness variation that originates from at least upper and lower portions of the sheet glass material G can be 15 µm or less.

Note that the sheet glass material G formed in the press forming process is also referred to as "glass blank".

Generally, when forming a gob of molten glass by cutting molten glass with a cutting blade, a portion of the molten glass that contacts the cutting blade is rapidly cooled, thereby forming a cut mark thereon. When press forming a gob including a cut mark, a sheer mark that originates from the cut mark is formed on a sheet glass material. The sheer mark may be aggregate of small air bubbles at the depth of several to several tens µm, or dents on the surface. The sheer mark may be arc-shaped for example as a whole. Remaining the sheer mark on a glass substrate for magnetic disk may not only impede read and write of magnetic data, but fail a hard disk drive device due to the contact between a head and the magnetic disk. Thus, it is required to grind and polish the glass substrate so deeply that the sheer mark is surely removed, thereby reducing efficiency of manufacturing of the glass substrate for magnetic disk.

By contrast, in the present embodiment, because the cut mark is heated after the gob is formed, temperature variation in the entirety of the glass gob becomes smaller. Thus, a formed sheer mark may be small and close to the principal surface or a sheer mark may not be formed.

(b) Scribing Process

Next, scribing process (Step 20) will be explained. After the press forming, scribing is performed to the formed sheet glass material G (glass blank) in the scribing process.

As used herein, the scribing means that two concentric (inside concentric and outside concentric) cutting-plane lines (scratch in the form of a line) are provided in the surface of the sheet glass material G with a scriber made of a super alloy or diamond particles in order to obtain the ring-shape of the formed sheet glass material G having a predetermined size.

The sheet glass material G scribed into two-concentric-circle shape is partially heated, and a portion outside the outside concentric circle and a portion inside the inside concentric circle are removed utilizing a difference in thermal expansion of the sheet glass material G, thereby obtaining the ring-shaped sheet glass material.

Note that a sheet glass material may be processed to have an outer diameter and uniformity, the degree of which scribing is not required for, and the ring-shaped sheet glass material may be obtained by forming an inner hole with a coring machine (drill) to the above sheet glass material.

As described above, in the press forming process according to the present embodiment, the formed sheer mark is small. Thus, when a sheer mark is formed around the center of the sheet glass material G, the sheer mark may be removed with the forming of the inner hole, or may be very small even when it remains.

(c) Shape processing Process (Chamfering Process)

Next, a shape processing process (Step S30) will be explained. Then shape processing is performed to the scribed sheet glass material G. The shape processing includes chamfering (chamfering of outer circumferential end portion and inner circumferential end portion).

The outer circumferential end portion and inner circumferential end portion of the ring-shaped sheet glass material G are chamfered using diamond abrasive grains.

(d) Grinding Process using Fixed Abrasive Grains

Next, a grinding process using fixed abrasive grains (Step S40) will be explained. In the grinding process using fixed abrasive grains, grinding is performed to the ring-shaped sheet glass material G using the fixed abrasive grains. For example, in the grinding using the fixed abrasive grains, removal stock is several µm to about 100 µm. For example, the fixed abrasive grains have the particle size of about 10 µm.

Figure 5A:
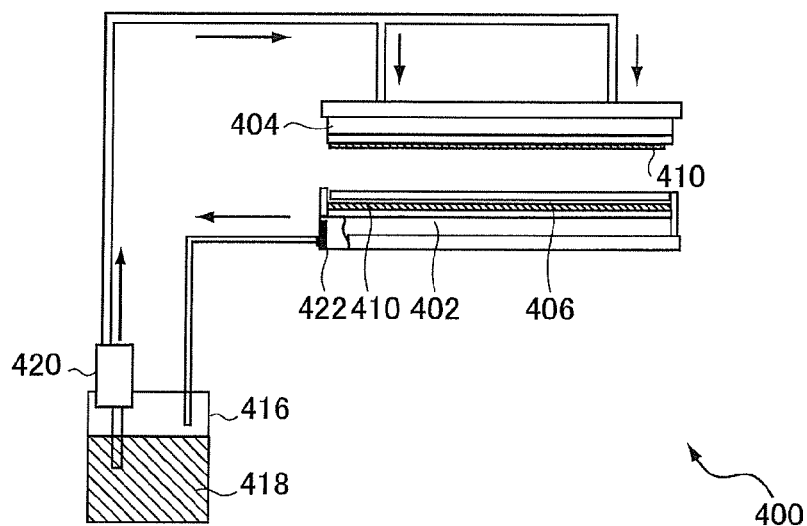
FIG. 5A is an overall view of an apparatus used to perform grinding using fixed abrasive grains.
Figure 5B:
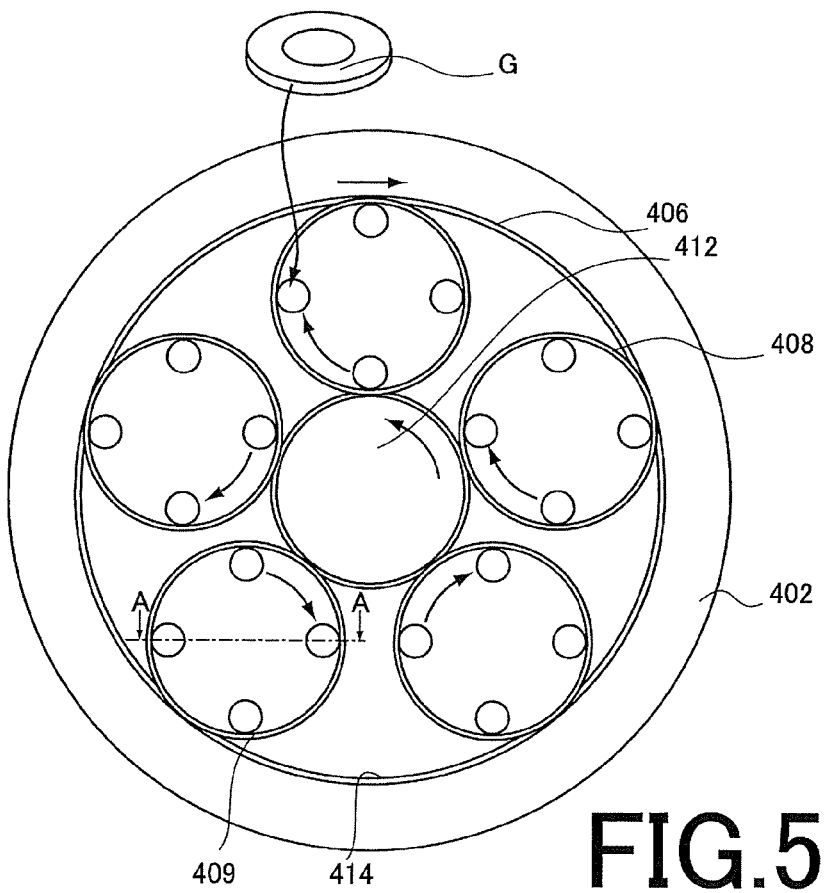
FIG. 5B is a view illustrating a carrier used in the apparatus of FIG. 5A.
Figure 6:
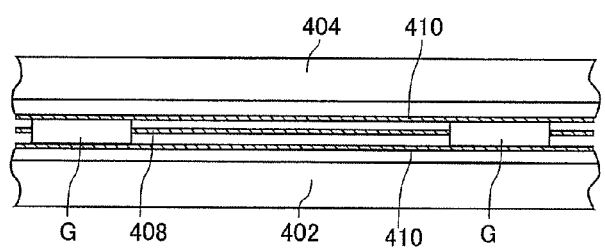
FIG. 6 is a view illustrating an arrangement in which a sheet glass material is ground.

Here, with reference to FIGS. 5A, 5B, and 6, the process for grinding the sheet glass material G will be explained. FIG. 5A is an overall view of an apparatus used to perform grinding using fixed abrasive grains. FIG. 5B is a view illustrating a carrier used in the apparatus of FIG. 5A. FIG. 6 is a view illustrating an arrangement in which a sheet glass material G is ground.

As illustrated in FIG. 5A and FIG. 6, an apparatus 400 includes a lower surface plate 402, an upper surface plate 404, an internal gear 406, a carrier 408, a diamond sheet 410, a sun gear 412, an internal gear 414, a reservoir 416, and a pump 420. The reservoir 416 includes coolant 418.

In the apparatus 400, the internal gear 406 is vertically sandwiched between the lower surface plate 402 and the upper surface plate 404. During the grinding, the plural carriers 408 are retained in the internal gear 406. In an example illustrated in FIG. 5B, the internal gear 406 retains the five carriers 408.

The surface of the diamond sheet 410 bonded to the lower surface plate 402 and the upper surface plate 404 in a planar manner constitutes a grinding surface. That is, the sheet glass material G is ground with the fixed abrasive grains using the diamond sheet 410.

As illustrated in FIG. 5B, the plural sheet glass materials G to be ground is retained while disposed in a circular hole provided in each carrier 408. During the grinding, the pair of principal surfaces of the sheet glass material G abuts on the diamond sheet 410 while being sandwiched between the lower surface plate 402 and the upper surface plate 404.

On the other hand, the sheet glass material G is retained on the lower surface plate 402 by the carrier 408 that includes a gear 409 in its outer circumference. The carrier 408 engages with the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the sheet glass material G is ground using the diamond sheet 410.

As illustrated in FIG. 5A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

In the grinding apparatus 400, the grinding is performed using the diamond sheet 410. Alternatively, the fixed abrasive grains of the diamond particles may be used instead of the diamond sheet 410. For example, a pellet that is formed by binding the diamond particles with a resin can be used in the grinding using the fixed abrasive grains.

(e) Edge Polishing Process

Next, an edge polishing process (Step S50) will be explained. In the edge polishing process, edge polishing is performed to the sheet glass material G.

In the edge polishing, mirror surface finishing is performed to an inner-circumferential-side end face and an outer-circumferential-side end face of the sheet glass material G by brush polishing. At this point, slurry that includes fine particles such as cerium oxide as the loose abrasive grains is used. The contamination of dust and damage such as a flaw are removed by performing the edge polishing. Therefore, generation of ions such as a sodium and potassium which cause corrosion can be prevented.

(f) First Polishing (Principal Surface Polishing) Process

Next, a first polishing process (Step S60) will be explained. In the first polishing process after the edge polishing process, the first polishing is performed to the ground principal surface of the sheet glass material G. For example, removal stock in the first polishing is several µm to about 50 µm.

The first polishing is intended to remove the flaw left on the principal surface after the grinding using the fixed abrasive grains and the deformation. The apparatus 400 used in the grinding (Step S40) using the fixed abrasive grains is used in the first polishing. At this point, the first polishing differs from the grinding using the fixed abrasive grains in the following points. That is, in the first polishing process, the slurry of the turbid loose abrasive grains is used instead of the fixed abrasive grains. In the first polishing process, the coolant is not used. In the first polishing process, the resin polisher is used instead of the diamond sheet 410.

For example, the slurry of the turbid fine particles such as cerium oxide (particle size: diameter of about 1 µm to about 2 µm) is used as the loose abrasive grains used in the first polishing.

(g) Chemically Strengthening Process

Next, a chemically strengthening process (Step S70) will be explained. In the chemically strengthening process after the first polishing process, the first polished sheet glass material G is chemically strengthened.

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced by the sodium ion and the potassium ion which have relatively large ion radiuses in the chemically strengthening solution, respectively, thereby strengthening the sheet glass material G.

The sheet glass material G to which the chemically strengthening treatment is performed is washed. For example, after washing the sheet glass material G using the sulfuric acid, the sheet glass material G is washed using pure water and IPA (isopropyl alcohol).

(h) Second Polishing (Final Polishing) Process

Next, a second polishing process (Step S80) will be explained. In the second polishing process, the second polishing is performed to the sheet glass material G after being chemically strengthened and well washed. For example, removal stock in the second polishing is about 1 µm.

The second polishing is intended to perform mirror surface polishing to the principal surface. The apparatus 400 that is used in the grinding (Step S40) using the fixed abrasive grains and the first polishing (Step S60) is used in the second polishing. The second polishing differs from the first polishing in terms of the kind and particle size of the loose abrasive grains, and hardness of the resin polisher.

For example, the slurry of the turbid fine particles such as colloidal silica (particle size: diameter of about 0.1 µm) is used as the loose abrasive grains used in the second polishing.

The polished sheet glass material G is then washed. A neutral detergent, pure water, and IPA are used in the washing.

The glass substrate for magnetic disk 2 having the surface irregularity, in which the flatness of the principal surface is 4 µm or less and the roughness of the principal surface is 0.2 nm or less, is obtained by the second polishing.

Then, as illustrated in FIG. 1, the magnetic layers 3A and 3B are deposited to the glass substrate for magnetic disk 2 to prepare the magnetic disk 1.

The flow of the manufacturing method illustrated in FIG. 2 is described above. In the flow of FIG. 2, the scribing (Step S20) and the shape processing (Step S30) are performed between the grinding using the fixed abrasive grains (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grains (Step S40), the first polishing (Step S60), and the second polishing (Step S80) are performed in this order, the scribing (Step S20), the shape processing (Step S30), and the chemically strengthening (Step S70) may appropriately be reordered.

In the present embodiment, the molten glass $L_G$ and the gob $G_G$ are heated, which enables reduction in temperature variation with respect to positions over the entirety of the gob $G_G$. Thus, viscosity variation with respect to positions over the entirety of the gob $G_G$ can be reduced, and thickness variation of the manufactured sheet glass material can be therefore reduced. Consequently, removal stock in the grinding process and the polishing processes can be reduced, and occurrence of cracks can be suppressed. Further, it is possible to suppress the "roll-off" which may occur at the outer circumferential edge portion of the principal surface of the sheet glass material.

When the cutting unit 160 cuts the molten glass $L_G$, cut marks are formed because the molten glass $L_G$ is rapidly cooled partially by the cutting unit 160. In the present embodiment, the heating section 165 heats the entirety of the gob $G_G$, and the cut marks are then heated as well. Thus, the cut marks are unlikely to remain on the gob $G_G$, and it is possible to prevent sheer marks that originate from the cut marks from being formed in the sheet glass material G That is, with the cut mark heated after the gob is formed, temperature variation in the whole of the glass gob becomes small. Thus, a formed sheer mark may be small and close to the principal surface or a sheer mark may not be formed.

As described above, the sheer mark formed in the press forming process according to the present embodiment is small and close to the principal surface. Thus, the sheer mark may be removed even with removal stock of about 50 μm of the subsequent grinding and/or polishing process.

Second Embodiment

Next, a manufacturing method of a glass substrate for magnetic disk according to the second embodiment will be described. The manufacturing method of a glass substrate for magnetic disk according to the present embodiment is different from the first embodiment in a press forming process. The other processes are the same as those described in the first embodiment, and explanations of the other processes are therefore omitted. The part different from the first embodiment will be explained.

Unlike the first embodiment, the heating section 165 is not provided around the cutting unit 160 in the present embodiment. Further, unlike the first embodiment, a holding section 180 is provided between the cutting unit 160 and the pressing unit 120 in the present embodiment.

Here, with reference to the side views illustrated in FIGS. 7A to 7C, the press forming process in the present embodiment will be explained. FIG. 7A is a side view illustrating an arrangement before the molten glass $L_G$ and a cutting unit 160 contact. FIG. 7B is a side view illustrating an arrangement after the cutting unit 160 cut the molten glass $L_G$. FIG. 7C is a side view illustrating an arrangement when the pressing unit 120 performs press forming for a lump of the molten glass $G_G$.

As illustrated in FIGS. 7A to 7C, the holding section 180 is provided between the pressing unit 120 that has moved to the catch position and the cutting unit 160. The holding section 180 includes a first member 181 and a second member 182. The first member 181 and the second member 182 are driven by a drive device (not illustrated) so as to mutually move on a horizontal surface. A recess, which is drawn with a broken line in the drawing, is formed at each top face of the first member 181 and the second member 182 such that, when the first member 181 and the second member 182 are bound and closed, a hemispheric recess is formed at the top face of the holding section 180.

Temperature of the holding section 180 is controlled by a temperature control mechanism (not illustrated). The temperature of the holding section 180 may be higher than room temperature, and may preferably be close to temperature of the molten glass $L_G$. In the present embodiment, the temperature of the holding section 180 is about 1,100 degree Celsius for example.

As illustrated in FIG. 7A, a molten glass material $L_G$ continuously flows out from the molten glass outflow port 111. The temperature of the molten glass $L_G$ is about 1,200 degree Celsius for example. At this time, the holding section 180 is closed at a position vertically downward to the molten glass outflow port 111.

As illustrated in FIG. 7B, the cutting unit 160 is driven at predetermined timing, and the molten glass material $L_G$ is cut with the first cutting blade 161 and the second cutting blade 162. Then, cut molten glass becomes substantially spherical gob $G_G$ due to the surface tension of the molten glass. In the example illustrated in FIG. 7B, an outflow quantity per time of the molten glass material $L_G$ and a driving interval of the cutting unit 160 are adjusted such that a gob $G_G$ having radius of about 10 mm is formed every time the cutting unit 160 is driven.

The formed gob $G_G$ drops vertically downward, and is held by the holding section 180. At this time, the lower portion of substantially spherical gob $G_G$ is received in the recess of the holding section 180, and heated. On the other hand, the upper portion of the gob $G_G$ is exposed to the upper side.

Next, the holding section 180 is opened, and the gob $G_G$ then drops vertically downward. The first driving unit 123 and the second driving unit 124 are driven such that the first die 121 and the second die 122 come close each other at the timing when the gob $G_G$ enters a gap between the first die 121 and the second die 122. This allows the gob $G_G$ to be captured (caught) between the first die 121 and the second die 122, as illustrated in FIG. 7C. Further, the inner circumferential surface 121a of the first die 121 and the inner circumferential surface 122a of the second die 122 come close with a minute gap, and then the gob $G_G$, which is sandwiched between the inner circumferential surface 121a of the first die 121 and the inner circumferential surface 122a of the second die 122, is formed into a thin sheet.

The subsequent processes are the same as those of the first embodiment described above.

In the present embodiment, the holding section 180 holds the gob $G_G$ formed by the cutting unit 160, and at least the lower portion of the gob $G_G$ is heated. Thus, temperature variation with respect to positions over the entirety of the gob $G_G$ can be reduced. Thus, viscosity variation with respect to positions over the entirety of the gob $G_G$ can be reduced, and thickness variation can be therefore reduced.

Other Embodiment

In the above embodiment, the temperature of the gob $G_G$ is adjusted by heating at least a portion of the gob $G_G$ of which temperature is low so that temperature variation with respect to positions over the entirety of the gob $G_G$ can be reduced. A method for adjusting the temperature of the gob $G_G$ is not limited to the one described above.

For example, the temperature of the gob $G_G$ may be adjusted by cooling a portion of the gob $G_G$ of which temperature is high so that temperature variation with respect to positions over the entirety of the gob $G_G$ can be reduced. Specifically, ventilation may be performed to the portion of the gob $G_G$ of which temperature is high, and the temperature of the gob $G_G$ may be adjusted.

In the embodiments described above, examples are explained in which the gob $G_G$ is temperature-equalized (that is, variation of temperatures in positions of the whole gob $G_G$ is reduced) using the eating section 165 or the holding section 180 located below the molten glass outflow port 111. In order to further strengthen the effect of the temperature equalization, time for temperature equalization (temperature equalization time) may be preferably lengthened. Specific configuration examples to lengthen the temperature equalization time will now be explained below. It should be noted that methods using temperature-equalization sections that blow out gas will be explained below, and that explanation of mechanism for an actuators and so forth for blowing out gas will be omitted. Any known mechanism may apply to such mechanism.

Figure 9A:
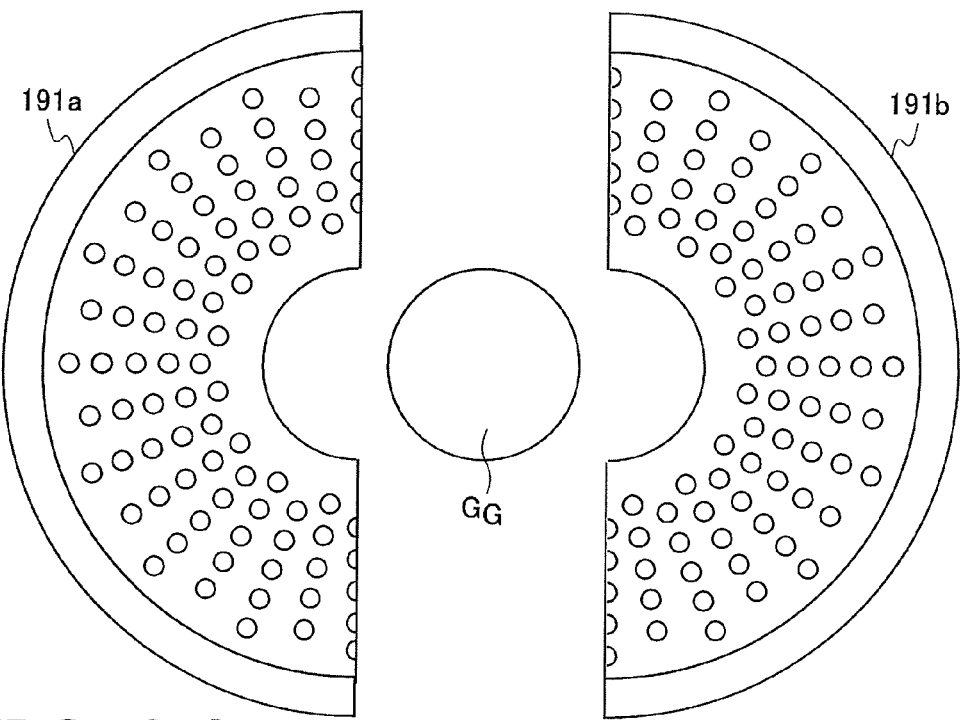
FIG. 9A is a plan view illustrating a condition in which the funnel-shaped temperature-equalization section is partitioned and the gob drops.
Figure 9B:
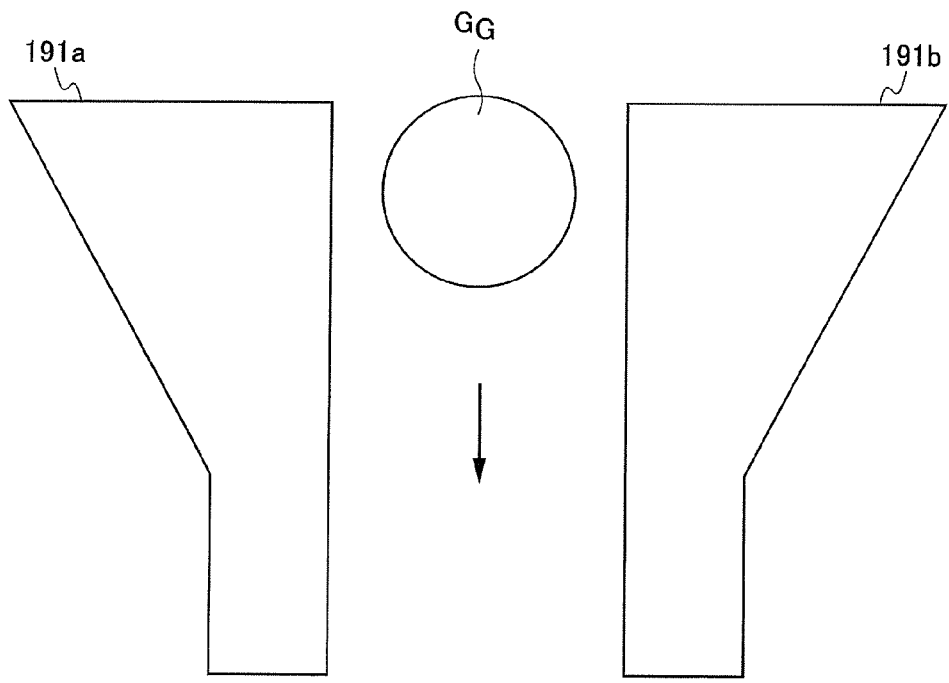
FIG. 9B is a side view illustrating a condition in which the funnel-shaped temperature-equalization section is partitioned and the gob drops.

Firstly, a configuration example using a temperature-equalization section 191 will be explained with reference to FIGS. 8A, 8B and FIGS. 9A, 9B. FIG. 8A is a plan view illustrating a condition in which the gob $G_G$ is temperature-equalized using a funnel-shaped temperature-equalization section 191. FIG. 8B is an A-A sectional of FIG. 8A illustrating a condition in which the gob $G_G$ is temperature-equalized using the funnel-shaped temperature-equalization section 191. FIG. 9A is a plan view illustrating a condition in which the funnel-shaped temperature-equalization section 191 is partitioned and the gob $G_G$ drops. FIG. 9B is a side view illustrating a condition in which the funnel-shaped temperature-equalization section 191 is partitioned and the gob $G_G$ drops. Note that, in FIGS. 8A and 8B, drawn length of gas flow FL substantially corresponds to flow velocity.

The temperature-equalization section 191 is located between the cutting unit 160 and the pressing unit 120. The temperature-equalization section 191 holds the dropping gob $G_G$ by floating the gob $G_G$ in order to temperature-equalize the gob $G_G$. The temperature-equalization section 191 is made of stainless steel for example, and has a hollow space inside. As illustrated in FIG. 8A, the temperature-equalization section 191 is provided with a plurality of fine holes 191h for blowing out gas into an inner surface (that is, into the hollow space). Diameter of Each of the holes 191h may be 50 μm for example. The holes 191h may be provided at intervals of 0.2 mm. The gas that blows out from the holes 191h may be air and so forth which is heated higher than the transition temperature of the glass and lower than softening point of the glass. With the gas blowing out from the holes 191h, the gob $G_G$ that drops from the cutting unit 160 is floated as illustrated in FIG. 8B, and then temperature-equalized. In order to prevent the glass from fusing with the temperature-equalization section 191 even when the glass contact the temperature-equalization section 191, the surface of the temperature-equalization section 191 may be preferably coated with platinum or gold. Material of the temperature-equalization section 191 is not limited to stainless steel but may be other ones having more heat resisting property, considering the transition temperature or softening point of the glass. The gas that blows out from the holes 191h is not limited to air, but may be other gases such as Nitride, considering durability of the temperature-equalization section 191.

After floating the gob in the temperature-equalization section 191 for a constant time to sufficiently temperature-equalize the gob, the temperature-equalization section 191 is partitioned into a first member 191a and a second member 191b in the horizontal direction, as illustrated in FIG. 9A. This allows the gob $G_G$ to drop for the pressing unit 120 in vertically downward direction.

Figure 11A:
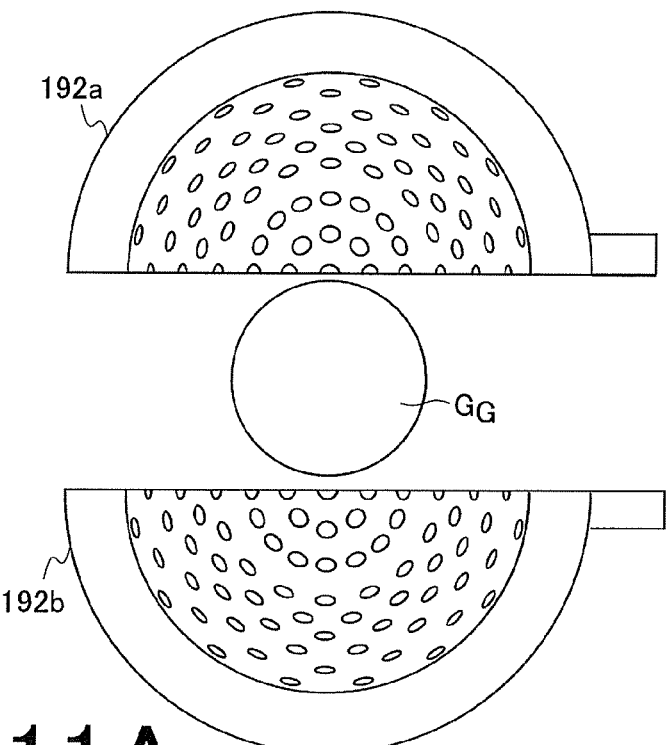
FIG. 11A is a plan view illustrating a condition in which the spoon-shaped temperature-equalization section is partitioned and the gob drops.
Figure 11B:
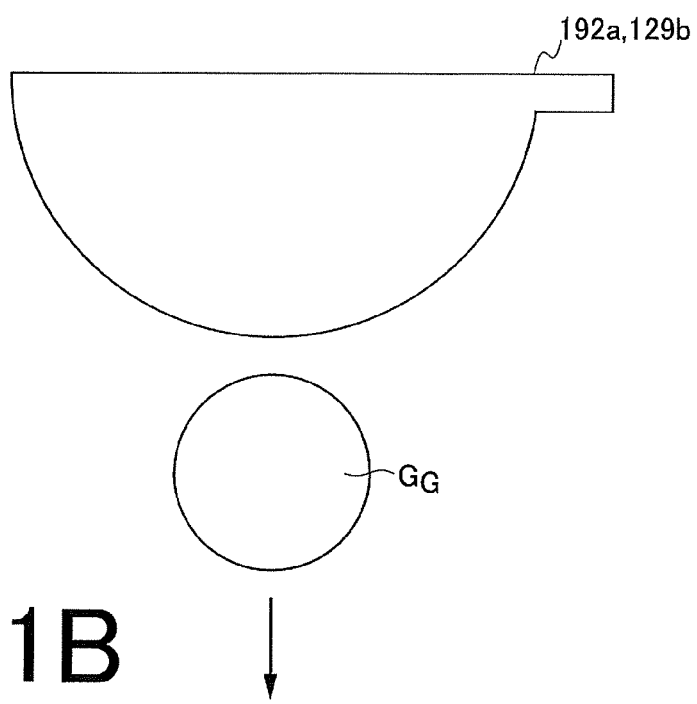
FIG. 11B is a side illustrating a condition in which the spoon-shaped temperature-equalization section is partitioned and the gob drops.

The temperature-equalization section 191 described above is funnel-shaped; however, structure of the temperature-equalization section is not limited to such shape. The temperature-equalization section may be spoon-shaped. A configuration example using a spoon-shaped temperature-equalization section 192 will be explained with reference to FIGS. 10A, 10B and FIGS. 11A, 11B. FIG. 10A is a plan view illustrating a condition in which the gob $G_G$ is temperature-equalized using a spoon-shaped temperature-equalization section 192. FIG. 10B is a B-B sectional of FIG. 10A illustrating a condition in which the gob $G_G$ is temperature-equal- ized using the spoon-shaped temperature-equalization section 192. FIG. 11A is a plan view illustrating a condition in which the spoon-shaped temperature-equalization section 192 is partitioned and the gob $G_G$ drops. FIG. 11B is a side view illustrating a condition in which the spoon-shaped temperature-equalization section 192 is partitioned and the gob $G_G$ drops. The temperature-equalization section 192 is also provided with a plurality of fine holes 192h from which gas is blown out, so that the gob $G_G$ floats inside the temperature-equalization section 192.

After floating the gob in the temperature-equalization section 192 for a constant time to sufficiently temperature-equalize the gob, the temperature-equalization section 192 is partitioned into a first member 192a and a second member 192b in the horizontal direction, as illustrated in FIG. 11A. This allows the gob $G_G$ to drop for the pressing unit 120 in vertically downward direction.

It should be noted that the funnel-shaped temperature-equalization section 191 may be able to blow out gas with high speed from the bottom, and float the gob $G_G$ more stably than the spoon-shaped temperature-equalization section 192.

Figure 13A:
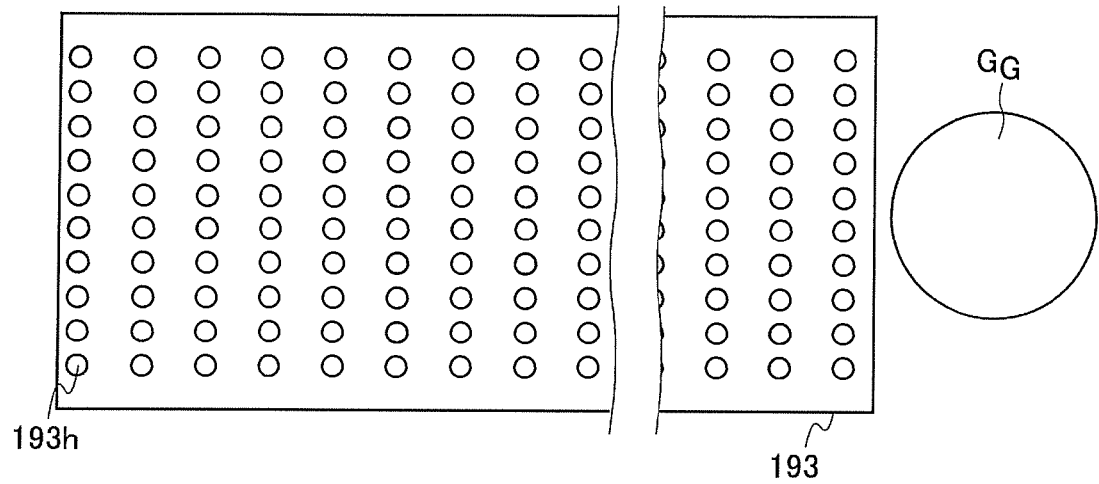
FIG. 13A is a plan view illustrating a condition in which the gob drops from the sheet-shaped temperature-equalization section.
Figure 13B:
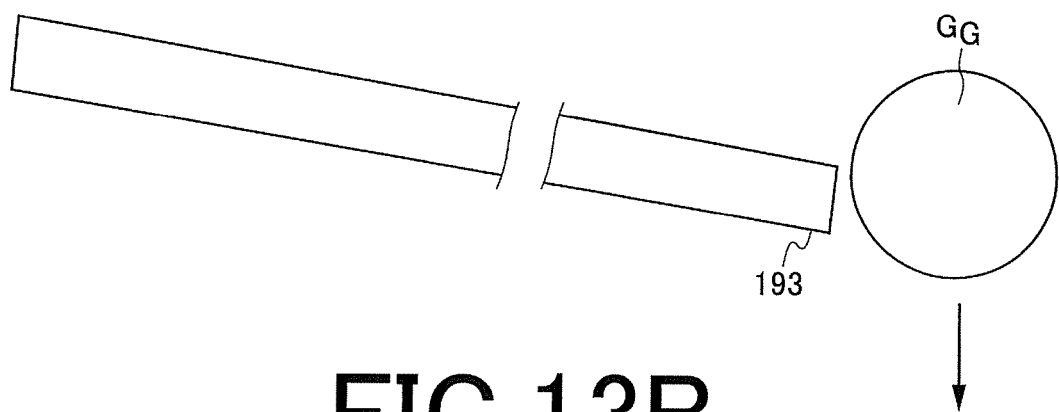
FIG. 13B is a side view illustrating a condition in which the gob drops from the sheet-shaped temperature-equalization section.

The temperature-equalization section may be flat or concave sheet-shaped. A configuration example using a sheet-shaped temperature-equalization section 193 will be explained with reference to FIGS. 12A, 12B and FIGS. 13A, 13B. FIG. 12A is a plan view illustrating a condition in which the gob $G_G$ is temperature-equalized using a sheet-shaped temperature-equalization section 193. FIG. 12B is a C-C sectional of FIG. 12A illustrating a condition in which the gob $G_G$ is temperature-equalized using the sheet-shaped temperature-equalization section 193. FIG. 13A is a plan view illustrating a condition in which the gob $G_G$ drops from the sheet-shaped temperature-equalization section 193. FIG. 13B is a side view illustrating a condition in which the gob $G_G$ drops from the sheet-shaped temperature-equalization section 193. The temperature-equalization section 193 is also provided with a plurality of fine holes 193h from which gas is blown out, so that the gob $G_G$ floats inside the temperature-equalization section 193.

As illustrated in FIG. 12B, the sheet-shaped temperature-equalization section 193 is arranged sloping to a horizontal direction. Thus, the gob $G_G$, which drops from the cutting unit 160, floats above the temperature-equalization section 193 while moving along a surface of the temperature-equalization section 193 due to influence of gravity. Then, as illustrated in FIGS. 13A, 13B, the gob $G_G$ drops for the pressing unit 120 in vertically downward direction after reaching an edge of the temperature-equalization section 193. When using the temperature-equalization section 193, the pressing unit 120 may be arranged shifted from a position off the molten glass outflow port 111 in the horizontal direction by longitudinal length of the sheet-shaped temperature-equalization section 193.

When the gob $G_G$ is temperature-equalized using either of the temperature-equalization sections as described above, continuation time of floating of the gob $G_G$ depends on necessity for how far temperature variation, that is, viscosity variation of the surface of the gob $G_G$ is to be reduced. In order to reduce thickness variation to 10 μm or even 5 μm, the gob $G_G$ may be preferably floated for a longer time. It should be noted that, when the gob $G_G$ is floated for a long time, absolute temperature of the gob $G_G$ may be down due to heat radiation. Accordingly there is a possibility that thin sheet glass formation may be difficult in the subsequent press forming. In such case, supplemental heating from the outside of the temperature-equalization section may be preferably performed.

Methods for such supplemental heating may be, but not limited to, infrared radiation or high frequency heating.

As described above, the temperature-equalization section is located between the cutting unit 160 and the pressing unit 120, and holds the dropping gob $G_G$ by floating the gob. This prevents the pressed glass blank from having length in a direction of drop greater than lengths in the other directions. That is, with the temperature-equalization section in use, there is advantage that the formed glass blank has substantially complete round. Due to this, machining allowance for the subsequent scribing process and the chamfering process is decreased, and useless amount of material is therefore decreased. This leads to cost reduction. When roundness of a disk-shaped glass material is for example 10 μm or less, it is not required to machine the outer circumference part of the glass material. Then, elution (alkali elution for example) of the glass component from the outer circumference part may be suppressed.

EXAMPLES

Simulations and experimental results will be explained below to verify the effect of the present inventions with reference to Examples and Comparative Examples.

Examples 1 to 4

Sheet glass materials G were manufactured through the press forming process according to the first embodiment that was explained with reference to FIG. 4. The glass transition temperature $T_G$ in each of the Examples 1, 2 was 500 degree Celsius. The glass transition temperature $T_G$ in each of the Examples 3, 4 was 650 degree Celsius. In the Examples 1 to 4, the temperature of the molten glass $L_G$ was 1,200 degree Celsius. In the Examples 1 to 4, the temperature of the heating section 165 is as shown in the below Table 1. In the Examples 1 to 4, the Table 1 shows: surface temperature of the cut mark formed last; surface temperature of the cut mark formed first; and results calculated with simulations of difference of viscosity of the cut mark formed last and the cut mark formed first. It should be note that, in the following Examples and Comparative Examples, the cut mark formed last was positioned at the top of the gob $G_G$, while the cut mark formed first was positioned at the bottom of the gob $G_G$.

Results of measurement of thickness variation of the sheet glass material G manufactured in the Examples 1 to 4 are shown in the Table 1. Here, the thickness variation of the sheet glass material G was measured with a micrometer manufactured by Mitsutoyo Corporation, Japan. 5 mm mesh on the principal surface of the single sheet glass material was assumed, and intersection points of the mesh which were stably measureable were selected for thickness measurement. The thickness variation was obtained by difference of the maximum thickness and minimum thickness measured. Viscosity of the gob was calculated with simulations based on the temperature of the surface of the gob which was measured with thermography, utilizing relation of temperature and viscosity which was learned beforehand.

TABLE 1

|  | Example 1 | Example 2 | Example 3 | Example 4 |
|---|---|---|---|---|
| Glass transition temperature (degree Celsius) | 500 | 500 | 650 | 650 |
| Heating Section (degree Celsius) | 1,100 | 650 | 800 | 600 |
| Temperature of Top of Gob (degree Celsius) | 1,050 | 1,000 | 1,000 | 1,000 |
| Temperature of Bottom of Gob (degree Celsius) | 1,000 | 930 | 950 | 910 |
| Difference of Viscosity of Cut Mark Formed Last and First (Poise) | $1.5 \times 10^4$ | $8.0 \times 10^4$ | $8.0 \times 10^5$ | $4.5 \times 10^6$ |
| Thickness Variation (μm) | 5 | 9 | 11 | 12 |

As shown in the Table 1, by providing the heating section 165, thickness variation of 15 or less of the sheet glass material was obtained. Further, it is understood that, as the temperature of the heating section 165 was higher, thickness variation of the sheet glass materials G was smaller.

Examples 5 to 8

Sheet glass materials G were manufactured through the press forming process according to the second embodiment that was explained with reference to FIG. 7. The glass transition temperature $T_G$ in each of the Examples 5, 6 was 500 degree Celsius. The glass transition temperature $T_G$ in each of the Examples 7, 8 was 650 degree Celsius. In the Examples 5 to 8, the temperature of the molten glass $L_G$ was 1,200 degree Celsius.

In the Examples 5 to 8, the temperature of the holding section 180 is as shown in the below Table 2. In the Examples 5 to 8, the Table 2 shows: surface temperature of the cut mark formed last; surface temperature of the cut mark formed first; and results calculated with simulations of difference of viscosity of the cut mark formed last and the cut mark formed first.

Results of measurement of thickness variation of the sheet glass material G manufactured in the Examples 5 to 8 are shown in the Table 2.

TABLE 2

|  | Example 5 | Example 6 | Example 7 | Example 8 |
|---|---|---|---|---|
| Glass transition temperature (degree Celsius) | 500 | 500 | 650 | 650 |
| Holding section (degree Celsius) | 800 | 500 | 1,100 | 650 |
| Temperature of Top of Gob (degree Celsius) | 1,000 | 1,000 | 1,050 | 1,000 |
| Temperature of Bottom of Gob (degree Celsius) | 950 | 900 | 1,000 | 930 |
| Difference of Viscosity of Cut Mark Formed Last and First (Poise) | $4.0 \times 10^4$ | $1.6 \times 10^5$ | $1.4 \times 10^5$ | $2.0 \times 10^6$ |
| Thickness Variation (μm) | 8 | 10 | 8 | 11 |

As shown in the Table 2, by providing the holding section 180, thickness variation of 15 μm or less of the sheet glass material was obtained. Further, it is understood that, as the temperature of the holding section 180 was higher, thickness variation of the sheet glass materials G was smaller.

Examples 9, 10 and Comparative Examples 1, 2

In the Comparative Examples 1 and 2, sheet glass materials G were manufactured without using the heating section 165 or the holding section 180.

In the Example 9, sheet glass materials G were manufactured through the press forming process according to the second embodiment that was explained with reference to FIG. 7. Note that, in the Example 9, the temperature of the holding section 180 was lower than the glass transition temperature $T_G$.

In the Example 10, sheet glass materials G were manufactured through the press forming process according to the first embodiment that was explained with reference to FIG. 4. Note that, in the Example 10, the temperature of the heating section 165 was lower than the glass transition temperature $T_G$.

In the Examples 9, 10 and Comparative Examples 1, 2, the temperature of the molten glass $L_G$ was 1,200 degree Celsius.

In the Examples 9, 10 and Comparative Examples 1, 2, the Table 3 shows: surface temperature of the cut mark formed last; surface temperature of the cut mark formed first; and results calculated with simulations of difference of viscosity of the cut mark formed last and the cut mark formed first.

Results of measurement of thickness variation of the sheet glass material G manufactured in the Examples 9, 10 and Comparative Examples 1, 2 are shown in the Table 3.

TABLE 3

|  | Comparative Example 1 | Example 9 | Comparative Example 2 | Example 10 |
|---|---|---|---|---|
| Glass transition temperature (degree Celsius) | 500 | 500 | 650 | 650 |
| Heating Section (degree Celsius) | — | — | — | 500 |
| Holding section (degree Celsius) | — | 400 | — | — |
| Temperature of Top of Gob (degree Celsius) | 950 | 950 | 950 | 1,000 |
| Temperature of Bottom of Gob (degree Celsius) | 700 | 750 | 700 | 890 |
| Difference of Viscosity of Cut Mark Formed Last and First (Poise) | $7.0 \times 10^7$ | $1.0 \times 10^7$ | $4.5 \times 10^{12}$ | $6.0 \times 10^6$ |
| Thickness Variation (μm) | 100 | 90 | 150 | 70 |

As shown in the Table 3, it is understood that the thickness variation of the manufactured sheet glass material G in the Examples 9, 10 and Comparative Examples 1, 2 was larger than that in the Examples 1 to 8. This is because, when either one of the heating section 165 and the holding section 180 was not provided, or when the temperature of the heating section 165 or the holding section 180 was lower than the glass transition temperature $T_G$, the difference was large between the surface temperature of the cut mark formed last and the surface temperature of the cut mark formed first, and consequently, difference of viscosity of the cut mark formed last and the cut mark formed first was large. It is also understood from the Table 3 that the thickness variations in the Examples 9, 10 was smaller that those in the Comparative Examples 1, 2 because the gob $G_G$ was heated before the press forming in the Examples 9, 10.

Next, the processes S20, S30, S50 to S80 (that is, excluding grinding using fixed abrasive grains) were performed sequentially to each of sheet glass materials G (glass blanks) of the Examples 1 to 10 to prepare glass substrates for magnetic disk. That is, glass substrates for magnetic disk were prepared without performing a grinding process for improving flatness of surfaces.

It should be noted that, in preparing the glass substrates for magnetic disk, the first polishing and the second polishing were performed in the following conditions.

First Polishing:

Loose abrasive grains of cerium oxide (average particle size: diameter of 1 μm to 2 μm) and a hard urethane pad (JIS (Japanese Industrial Standards)-A hardness: 80 to 100) were used for polishing. Removal stock in the first polishing was 10 μm to 40 μm.

Second Polishing

Loose abrasive grains of colloidal silica (average particle size: diameter of 20 nm to 40 nm) and a soft polyurethane pad (Acker C hardness: 50 to 80) were used for polishing. Removal stock in the second polishing was 1 μm to 5 μm.

As the surfaces of the prepared glass substrates for magnetic disk were visually inspected, there were no sheer marks observed on the principal surfaces. It is understood from this that, because the sheer mark formed on the glass blank of the Example 1 to 10 was small and close to the principal surface, the sheer mark was removed with removal stock of 50 μm or less.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A manufacturing method of a glass blank for a magnetic disk including a pair of principal surfaces, the method comprising:
    a dropping process for dropping a lump of molten glass by cutting molten glass with cutting blades so that the lump of molten glass is separated from the molten glass and is out of contact with the molten glass as the lump falls along a dropping path;
    a pressing process for forming a sheet glass material by sandwiching the lump from both sides of the dropping path of the lump, at substantially the same time, with surfaces of the pair of dies facing together to catch the lump as the lump is falling along the dropping path, and performing press forming to the lump; and
    a temperature adjusting process for adjusting temperature of the lump during a period of time beginning at a time when the lump is dropped and ending at a time that the pair of dies press the lump in the pressing process such that the temperature adjusting process occurs while the lump is falling vertically along the dropping path and viscosity variation of the lump is reduced with respect to positions over the entirety of the lump in the pressing process.

2. A manufacturing method of a glass blank for a magnetic disk according to claim 1, wherein the temperature adjusting process heats the lump by use of a heating section, the heating section positioned around the dropping path of the lump.

3. A manufacturing method of a glass blank for a magnetic disk according to claim 1, wherein the temperature adjusting process heats the lump by use of a temperature-equalization section, the temperature-equalization section holding the dropping lump by floating the lump thereabove.

4. A manufacturing method of a glass blank for a magnetic disk according to claim 1, further comprising a cutting process for cutting molten glass with cutting blades, wherein the temperature adjusting process heats a cut mark that is formed with the cutting blades in the cutting process.

5. A manufacturing method of a glass blank for a magnetic disk according to claim 1, wherein a difference of the viscosity of two cut marks formed on the lump is five million poise or less.

6. A manufacturing method of a glass blank for a magnetic disk according to claim 1, wherein temperatures of the pair of dies are lower than a strain point of the glass.

7. A manufacturing method of a glass blank for a magnetic disk according to claim 1, wherein the glass contains, as converted based on the oxide, denoted as molar percentages: 50 to 75% $SiO_2$, 1 to 15% $Al_2O_3$, totally 5 to 35% at least one component selected from the group of $Li_2O$, $Na_2O$, and $K_2O$, totally 0 to 20% at least one component selected from the group of MgO, CaO, SrO, BaO, and ZnO, and totally 0 to 10% at least one component selected from the group of $ZrO_2$, $TiO_2$, $La_2O_3$, $Y_2O_3$, $Ta_2O_5$, $Nb_2O_5$, and $HfO_2$.

8. A manufacturing method of a glass blank for a magnetic disk according to claim 1, wherein a thickness variation of the glass blank is 15 µm or less.

9. A manufacturing method of a glass blank for a magnetic disk including a pair of principal surfaces, the method comprising:
a dropping process for dropping a lump of molten glass by cutting molten glass with cutting blades so that the lump of molten glass is separated from the molten glass and is out of contact with the molten glass as the lump falls along a dropping path;
a pressing process for forming a sheet glass material by sandwiching the lump from both sides of the dropping path of the lump, at substantially the same time, with surfaces of the pair of dies facing together to catch the lump as the lump is falling along the dropping path, and performing press forming to the lump; and
a temperature adjusting process for providing a temperature higher than a transition temperature of the glass to heat the lump with the temperature higher than the transition temperature of the glass during a period of time beginning at a time when the lump is dropped and ending at a time that the pair of dies press the lump such that the temperature adjusting process occurs while the lump is falling vertically along the dropping path.

10. A manufacturing method of a glass blank for a magnetic disk according to claim 9, wherein the temperature adjusting process heats the lump by use of a heating section, the heating section positioned around dropping path of the lump.

11. A manufacturing method of a glass blank for a magnetic disk, the method comprising:
a cutting process for cutting molten glass with cutting blades to obtain a lump of molten glass so that the lump of molten glass is separated from the molten glass and is out of contact with the molten glass as the lump falls along a dropping path;
a heating process for heating the lump of molten glass beginning at a time when the lump is dropped such that the heating process occurs while the lump is falling vertically along the dropping path; and
a forming process for preparing a glass blank for magnetic disk of sheet glass material by press forming the lump of molten glass with a pair of dies that catch the lump as the lump is falling along the dropping path after the heating process which ends at a time that the pair of dies catch the lump as the forming process begins.

12. A manufacturing method of a glass blank for a magnetic disk according to claim 11, wherein a temperature of the molten glass is 1,000 degree Celsius or higher.

13. A manufacturing method of a glass blank for a magnetic disk according to claim 11, wherein heating process heats the lump with temperature higher than transition temperature of the glass.

14. A manufacturing method of a glass blank for a magnetic disk according to claim 11, wherein temperatures of the pair of dies at timing when the press forming begins are lower than a strain point of the glass.

15. A manufacturing method of a glass blank for a magnetic disk according to claim 11, wherein the glass contains, as converted based on the oxide, denoted as molar percentages: 50 to 75% $SiO_2$, 1 to 15% $Al_2O_3$, totally 5 to 35% at least one component selected from the group of $Li_2O$, $Na_2O$, and $K_2O$, totally 0 to 20% at least one component selected from the group of MgO, CaO, SrO, BaO, and ZnO, and totally 0 to 10% at least one component selected from the group of $ZrO_2$, $TiO_2$, $La_2O_3$, $Y_2O_3$, $Ta_2O_5$, $Nb_2O_5$, and $HfO_2$.

16. A manufacturing method of a glass blank for a magnetic disk according to claim 11, wherein the heating process heats the lump of molten glass while the lump cut in the cutting process drops, and wherein the pair of dies is located on the both sides of the dropping path.

17. A manufacturing method of a glass blank for a magnetic disk according to claim 11, wherein the heating process blows out heated gas for at least a cut portion of the lump of molten glass cut in the cutting process.

18. A manufacturing method of a glass blank for a magnetic disk according to claim 11, wherein the heating process heats the lump by use of a heating section, the heating section positioned around dropping path of the lump.

19. A manufacturing method of a glass substrate for a magnetic disk by use of a glass blank for magnetic disk manufactured by a method of a glass blank for magnetic disk, the method of a glass blank for magnetic disk comprising:
a cutting process for cutting molten glass with cutting blades to obtain a lump of molten glass so that the lump of molten glass is separated from the molten glass and is out of contact with the molten glass as the lump falls along a dropping path;
a heating process for heating the lump of molten glass beginning at a time when the lump is dropped such that the heating process occurs while the lump is falling vertically along the dropping path; and
a forming process for preparing a glass blank for magnetic disk of sheet glass material by press forming the lump of molten glass with a pair of dies that catch the lump as the lump is falling along the dropping path after the heating process which ends at a time that the pair of dies catch the lump as the forming process begins.

20. A manufacturing method of a glass substrate for a magnetic disk according to claim 19, the method comprising a machining process for machining a principal surface of the glass blank for magnetic disk with removal stock of 50 µm or less.

21. A manufacturing method of a glass blank for a magnetic disk according to claim 19, wherein the heating process heats the lump by use of a heating section, the heating section positioned around dropping path of the lump.

* * * * *